US012633293B2

(12) United States Patent
Liu et al.

(10) Patent No.: US 12,633,293 B2
(45) Date of Patent: May 19, 2026

(54) THREE-DIMENSIONAL AUDIO SIGNAL PROCESSING METHOD AND APPARATUS

(71) Applicant: HUAWEI TECHNOLOGIES CO., LTD., Guangdong (CN)

(72) Inventors: Shuai Liu, Beijing (CN); Yuan Gao, Beijing (CN); Bingyin Xia, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 18/532,085

(22) Filed: Dec. 7, 2023

(65) Prior Publication Data

US 2024/0112684 A1 Apr. 4, 2024

Related U.S. Application Data

(63) Continuation of application No. PCT/CN2022/096546, filed on Jun. 1, 2022.

(30) Foreign Application Priority Data

Jun. 11, 2021 (CN) ......................... 202110657283.7
Jun. 23, 2021 (CN) ......................... 202110700570.1

(51) Int. Cl.
*G10L 19/002* (2013.01)
*G10L 19/008* (2013.01)
*H04S 7/00* (2006.01)

(52) U.S. Cl.
CPC .......... *G10L 19/002* (2013.01); *G10L 19/008* (2013.01); *H04S 7/00* (2013.01)

(58) Field of Classification Search
CPC .... G10L 19/002; G10L 19/008; G10L 19/167
See application file for complete search history.

(56) References Cited

U.S. PATENT DOCUMENTS 10,075,802 B1 9/2018 Kim et al.
11,057,731 B2 * 7/2021 Tsingos .................. H04S 3/008
(Continued)

FOREIGN PATENT DOCUMENTS

CN 107493542 A 12/2017
CN 114582357 A 6/2022

OTHER PUBLICATIONS

3rd Generation Partnership Project; Technical Specification Group Services and System Aspects; Codec for Immersive Voice and Audio Services; General overview (Release 18). 3GPP TS 26.250 V1.0.0 (Sep. 2023). total 12 pages.

*Primary Examiner* — Akwasi M Sarpong
(74) *Attorney, Agent, or Firm* — WOMBLE BOND DICKINSON (US) LLP

(57) ABSTRACT

Embodiments of this application disclose a three-dimensional audio signal processing method and apparatus, to implement bit allocation of a signal. The method includes: performing spatial coding on a to-be-coded three-dimensional audio signal, to obtain a transmission channel signal and transmission channel attribute information, where the transmission channel signal includes at least one virtual speaker signal group and at least one residual signal group; and determining a bit allocation ratio of the virtual speaker signal group and a bit allocation ratio of the residual signal group based on the transmission channel attribute information.

20 Claims, 5 Drawing Sheets

(56) References Cited

U.S. PATENT DOCUMENTS

| | | | | |
|---|---|---|---|---|
| 12,142,285 | B2 * | 11/2024 | Olivieri | H04L 65/752 |
| 2007/0127733 | A1 * | 6/2007 | Henn | G10L 19/008<br>381/80 |
| 2020/0296535 | A1 * | 9/2020 | Tsingos | H04S 5/00 |
| 2020/0402522 | A1 * | 12/2020 | Olivieri | G10L 19/167 |
| 2021/0219084 | A1 * | 7/2021 | Laitinen | H04S 3/02 |

* cited by examiner

THREE-DIMENSIONAL AUDIO SIGNAL PROCESSING METHOD AND APPARATUS

CROSS-REFERENCE TO RELATED APPLICATIONS

This application is a continuation of International Application No. PCT/CN2022/096546, filed on Jun. 1, 2022, which claims priority to Chinese Patent Application No. 202110657283.7, filed on Jun. 11, 2021, and Chinese Patent Application No. 202110700570.1, filed on Jun. 23, 2021. All of the aforementioned patent applications are hereby incorporated by reference in their entireties.

TECHNICAL FIELD

This application relates to the field of audio processing technologies, and in particular, to a three-dimensional audio signal processing method and apparatus.

BACKGROUND

A three-dimensional audio technology is widely applied to aspects of wireless communication voice, virtual reality/augmented reality, media audio, and the like. In the three-dimensional audio technology, a sound event and three-dimensional sound field information in a real world are obtained, processed, transmitted, rendered, and played back. The three-dimensional audio technology enables a sound to have a strong sense of space, envelopment, and immersion, and provides people with extraordinary "immersive" auditory experience. In a higher order ambisonics (HOA) technology, recording, coding, and playback stages are unrelated to a speaker layout, data in a HOA format is rotatably played back, and there is higher flexibility in playback of three-dimensional audio. Therefore, there are more extensive attention and research.

A capture device (for example, a microphone) captures a large amount of data, records three-dimensional sound field information, and transmits a three-dimensional audio signal to a playback device (for example, a speaker or a headphone), so that the playback device plays the three-dimensional audio signal. Because the three-dimensional sound field information has a large amount of data, a large amount of storage space is required to store the data, and a bandwidth requirement of transmitting the three-dimensional audio signal is high. To resolve the foregoing problems, the three-dimensional audio signal may be compressed, and compressed data may be stored or transmitted.

Currently, a coder may code the three-dimensional audio signal by using a plurality of pre-configured virtual speakers. However, how to perform bit allocation of the signal after the coder codes the three-dimensional audio signal is still an unsolved problem.

SUMMARY

Embodiments of this application provide a three-dimensional audio signal processing method and apparatus, to implement bit allocation of a signal.

To resolve the foregoing technical problem, embodiments of this application provide the following technical solutions:

According to a first embodiment, this application provides a three-dimensional audio signal processing method, including: performing spatial coding on a to-be-coded three-dimensional audio signal, to obtain a transmission channel signal and transmission channel attribute information, where the transmission channel signal includes at least one virtual speaker signal group and at least one residual signal group; and determining a bit allocation ratio of the virtual speaker signal group and a bit allocation ratio of the residual signal group based on the transmission channel attribute information. In the foregoing solution, in this embodiment of this application, the three-dimensional audio signal is coded, to obtain a transmission channel signal and transmission channel attribute information. The transmission channel signal may include the at least one virtual speaker signal group and the at least one residual signal group, and the transmission channel attribute information may be used to separately determine the bit allocation ratio of the virtual speaker signal group and the bit allocation ratio of the residual signal group, to resolve a problem that bit allocation of a signal cannot be determined.

In one embodiment, the transmission channel attribute information includes virtual speaker coding efficiency; and the performing spatial coding on a to-be-coded three-dimensional audio signal, to obtain transmission channel attribute information includes: performing signal reconstruction on the to-be-coded three-dimensional audio signal by using a virtual speaker, to obtain a reconstructed three-dimensional audio signal; obtaining an energy representation value of the reconstructed three-dimensional audio signal and an energy representation value of the to-be-coded three-dimensional audio signal; and obtaining the virtual speaker coding efficiency based on the energy representation value of the reconstructed three-dimensional audio signal and the energy representation value of the to-be-coded three-dimensional audio signal. In the foregoing solution, a coder side first performs signal reconstruction by using the virtual speaker, to obtain the reconstructed three-dimensional audio signal. The coder side may calculate an energy representation value of a signal on each transmission channel, for example, may obtain the energy representation value of the reconstructed three-dimensional audio signal and the energy representation value of the to-be-coded three-dimensional audio signal. An energy representation value that is of a three-dimensional audio signal and that exists before signal reconstruction is different from an energy representation value that is of the three-dimensional audio signal and that exists after signal reconstruction. Therefore, the virtual speaker coding efficiency may be calculated based on a change between the energy representation value that is of the three-dimensional audio signal and that exists before signal reconstruction is different from the energy representation value that is of the three-dimensional audio signal and that exists after signal reconstruction.

In one embodiment, the transmission channel attribute information includes an energy ratio of the virtual speaker signal group; and the method further includes: obtaining an energy representation value of the virtual speaker signal group based on an energy representation value of each virtual speaker signal in the virtual speaker signal group; obtaining an energy representation value of the residual signal group based on an energy representation value of each residual signal in the residual signal group; and obtaining the energy ratio of the virtual speaker signal group based on the energy representation value of the virtual speaker signal group and the energy representation value of the residual signal group. In the foregoing solution, the coder side obtains the energy representation value of each virtual speaker signal in the virtual speaker signal group, and then adds energy representation values of all virtual speaker signals in a same group, to obtain the energy representation value of the virtual speaker signal group. If there are a plurality of virtual speaker signal groups, an energy representation value of each virtual speaker signal group may be calculated in the foregoing manner. In a same manner, the coder side may obtain the energy representation value of the residual signal group based on the energy representation value of each residual signal in the residual signal group. Finally, the coder side may obtain the energy ratio of the virtual speaker signal group based on the energy representation value of the virtual speaker signal group and the energy representation value of the residual signal group. The energy ratio of the virtual speaker signal group may indicate a ratio of the energy of the virtual speaker signal group to total transmission channel signal energy. If the energy ratio of the virtual speaker signal group is high, it indicates that the energy of the virtual speaker signal group is dominant in the total transmission channel signal energy. If the energy ratio of the virtual speaker signal group is low, it indicates that the energy of the virtual speaker signal group is not dominant (that is, weak) in the total transmission channel signal energy.

In one embodiment, the transmission channel attribute information includes a virtual speaker code identifier, and the virtual speaker code identifier indicates whether bit allocation of the virtual speaker signal group is dominant; and the performing spatial coding on a to-be-coded three-dimensional audio signal, to obtain transmission channel attribute information includes: performing spatial coding on the to-be-coded three-dimensional audio signal, to obtain a quantity of anisotropic sound sources of the transmission channel signal and virtual speaker coding efficiency; and obtaining the virtual speaker code identifier based on the quantity of anisotropic sound sources of the transmission channel signal and the virtual speaker coding efficiency. In the foregoing solution, after obtaining the quantity of anisotropic sound sources of the transmission channel signal and the virtual speaker coding efficiency, the coder side obtains a value of the virtual speaker code identifier based on a determining condition met by the quantity of anisotropic sound sources of the transmission channel signal and the virtual speaker coding efficiency.

In one embodiment, the obtaining the virtual speaker code identifier based on the quantity of anisotropic sound sources of the transmission channel signal and the virtual speaker coding efficiency includes: when the quantity of anisotropic sound sources of the transmission channel signal is less than or equal to a preset threshold of the quantity of anisotropic sound sources and the virtual speaker coding efficiency is greater than or equal to a preset first virtual speaker coding efficiency threshold, determining that the virtual speaker code identifier is dominant; or when the quantity of anisotropic sound sources of the transmission channel signal is greater than a preset threshold of the quantity of anisotropic sound sources or the virtual speaker coding efficiency is less than a preset first virtual speaker coding efficiency threshold, determining that the virtual speaker code identifier is not dominant. In the foregoing solution, the coder side may determine the virtual speaker code identifier by comparing the determining condition and each of the quantity of anisotropic sound sources and the virtual speaker coding efficiency, to determine the bit allocation ratio of the virtual speaker signal group and the bit allocation ratio of the residual signal group based on the virtual speaker code identifier.

In one embodiment, dominance includes sub-dominance or pre-dominance; and the determining that the virtual speaker code identifier is dominant includes: when the virtual speaker coding efficiency is greater than or equal to the first virtual speaker coding efficiency threshold and the virtual speaker coding efficiency is less than or equal to a preset second virtual speaker coding efficiency threshold, determining that the virtual speaker code identifier is sub-dominant; or when the virtual speaker coding efficiency is greater than or equal to the first virtual speaker coding efficiency threshold and the virtual speaker coding efficiency is greater than a preset second virtual speaker coding efficiency threshold, determining that the virtual speaker code identifier is pre-dominant, where the second virtual speaker coding efficiency threshold is greater than the first virtual speaker coding efficiency threshold. In the foregoing solution, the coder side may further divide a case in which the virtual speaker code identifier is dominant, to obtain two cases: a case in which the virtual speaker code identifier is sub-dominant and a case in which the virtual speaker code identifier is pre-dominant. It can be understood that, if the virtual speaker code identifier is pre-dominant, more bits need to be allocated to the virtual speaker signal group. For example, after an initial bit ratio of the virtual speaker signal group is determined, the bit ratio may be increased. If the virtual speaker code identifier is sub-dominant, a quantity of bits less than a quantity of bits allocated when the virtual speaker code identifier is pre-dominant need to be allocated to the virtual speaker signal group. However, the quantity of bits that need to be allocated to the virtual speaker signal group still needs to be greater than a quantity of bits allocated when the virtual speaker code identifier is not dominant. For example, after an initial bit ratio of the virtual speaker signal group is determined, the bit ratio may be increased. In comparison, a bit ratio that is an increment in a case of pre-dominance is greater than a bit ratio that is an increment in a case of sub-dominance.

In one embodiment, the transmission channel attribute information includes the energy ratio of the virtual speaker signal group and/or the virtual speaker code identifier; and the determining a bit allocation ratio of the virtual speaker signal group and a bit allocation ratio of the residual signal group based on the transmission channel attribute information includes: determining the bit allocation ratio of the virtual speaker signal group and the bit allocation ratio of the residual signal group according to a preset first signal group bit allocation algorithm when the energy ratio of the virtual speaker signal group is greater than or equal to a preset first energy ratio threshold and/or the virtual speaker code identifier is pre-dominant; or determining the bit allocation ratio of the virtual speaker signal group and the bit allocation ratio of the residual signal group according to a preset second signal group bit allocation algorithm when the energy ratio of the virtual speaker signal group is greater than or equal to a preset second energy ratio threshold and less than a preset first energy ratio threshold and/or the virtual speaker code identifier is sub-dominant, where the second energy ratio threshold is less than the first energy ratio threshold; or determining the bit allocation ratio of the virtual speaker signal group and the bit allocation ratio of the residual signal group according to a preset third signal group bit allocation algorithm when the energy ratio of the virtual speaker signal group is less than a preset first energy ratio threshold or the virtual speaker code identifier is not dominant. In the foregoing solution, a plurality of signal group bit allocation algorithms may be preset at the coder side. When the transmission channel attribute information meets different conditions, different signal group bit allocation algorithms may be used, so that when the transmission channel attribute information meets a condition, bit allocation ratios matching the condition can be allocated to the virtual speaker signal group and the residual signal group, to improve efficiency of coding the three-dimensional audio signal by the coder side.

In one embodiment, the determining the bit allocation ratio of the virtual speaker signal group and the bit allocation ratio of the residual signal group according to a preset first signal group bit allocation algorithm when the energy ratio of the virtual speaker signal group is greater than or equal to a preset first energy ratio threshold and/or the virtual speaker code identifier is pre-dominant includes: when directionalNrgRatio≥TH1, and/or S≤TH0 and η≥TH2 are met, calculating the bit allocation ratio of the virtual speaker signal group in the following manner: Ratio1_1=FAC1*directionalNrgRatio+(1−FAC1)*maxdirectionalNrgRatio, where directionalNrgRatio represents the energy ratio of the virtual speaker signal group, S is the quantity of anisotropic sound sources, η represents the virtual speaker coding efficiency, maxdirectionalNrgRatio is a preset maximum bit allocation ratio of the virtual speaker signal group, FAC1 is a preset first adjustment factor, Ratio1_1 is the bit allocation ratio of the virtual speaker signal group, * represents a multiplication operation, TH1 is the first energy ratio threshold, TH0 is the threshold of the quantity of anisotropic sound sources, and TH2 is the second virtual speaker coding efficiency threshold; and calculating the bit allocation ratio of the residual signal group in the following manner: Ratio2=1−Ratio1_1, where Ratio1_1 is the bit allocation ratio of the virtual speaker signal group, and Ratio2 is the bit allocation ratio of the residual signal group. In the foregoing solution, it may be learned from a calculation procedure of Ratio1_1 that the bit allocation ratio of the virtual speaker signal group is increased, and therefore, the coder side may allocate more bits to the virtual speaker signal group. The transmission channel signal includes the virtual speaker signal group and the residual signal group. After the bit allocation ratio Ratio1_1 of the virtual speaker signal group is obtained, the bit allocation ratio of the residual signal group may be obtained according to a calculation formula of Ratio2.

In one embodiment, after the bit allocation ratio of the virtual speaker signal group is obtained, the method further includes: updating the bit allocation ratio of the virtual speaker signal group in the following manner: Ratio1_2=min(Ratio1_1, maxdirectionalNrgRatio+FAC2*Ratio1_1), where Ratio1_2 represents an updated bit allocation ratio of the virtual speaker signal group, FAC2 is a preset second adjustment factor, maxdirectionalNrgRatio is the preset maximum bit allocation ratio of the virtual speaker signal group, Ratio1_1 is the bit allocation ratio that is of the virtual speaker signal group and that exists before updating, * represents a multiplication operation, and min is a minimization operation. In the foregoing solution, it may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner.

In one embodiment, the determining the bit allocation ratio of the virtual speaker signal group and the bit allocation ratio of the residual signal group according to a preset second signal group bit allocation algorithm when the energy ratio of the virtual speaker signal group is greater than or equal to a preset second energy ratio threshold and less than a preset first energy ratio threshold and/or the virtual speaker code identifier is sub-dominant, where the second energy ratio threshold is less than the first energy ratio threshold includes: when TH3≤directionalNrgRatio<TH1 is met, and/or S≤TH0 and TH4≤η≤TH2 are met, calculating Ratio1_1 in the following manner: Ratio1_1=FAC3*directionalNrgRatio+(1−FAC3)*maxdirectionalNrgRatio, where maxdirectionalNrgRatio is a preset bit allocation ratio of the virtual speaker signal group, FAC3 is a preset third adjustment factor, directionalNrgRatio represents the energy ratio of the virtual speaker signal group, S is the quantity of anisotropic sound sources, η represents the virtual speaker coding efficiency, Ratio1_1 is the bit allocation ratio of the virtual speaker signal group, * represents a multiplication operation, TH0 is the threshold of the quantity of anisotropic sound sources, TH1 is the first energy ratio threshold, TH2 is the second virtual speaker coding efficiency threshold, TH3 is the second energy ratio threshold, and TH4 is the first virtual speaker coding efficiency threshold; and calculating the bit allocation ratio of the residual signal group in the following manner: Ratio2=1−Ratio1_1, where Ratio1_1 is the bit allocation ratio of the virtual speaker signal group, and Ratio2 is the bit allocation ratio of the residual signal group. In the foregoing solution, it may be learned from a calculation procedure of Ratio1_1 that the bit allocation ratio of the virtual speaker signal group is increased, and therefore, the coder side may allocate more bits to the virtual speaker signal group. The transmission channel signal includes the virtual speaker signal group and the residual signal group. After the bit allocation ratio Ratio1_1 of the virtual speaker signal group is obtained, the bit allocation ratio of the residual signal group may be obtained according to a calculation formula of Ratio2.

In one embodiment, after the bit allocation ratio of the virtual speaker signal group is obtained, the method further includes: updating the bit allocation ratio of the virtual speaker signal group in the following manner: Ratio1_2=min(Ratio1_1, maxdirectionalNrgRatio+FAC4*Ratio1_1), where Ratio1_2 represents an updated bit allocation ratio of the virtual speaker signal group, FAC4 a preset fourth adjustment factor, maxdirectionalNrgRatio is the preset maximum bit allocation ratio of the virtual speaker signal group, Ratio1_1 is the bit allocation ratio that is of the virtual speaker signal group and that exists before updating, * represents a multiplication operation, and min is a minimization operation. In the foregoing solution, it may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner.

In one embodiment, the method further includes: when there are a plurality of residual signal groups, calculating a bit allocation ratio of an it h residual signal group in the following manner: Ratio2_1=Ratio2*(R_i/C), where R_i represents a quantity of transmission channels included in the it h residual signal group, C is a total quantity of transmission channels in all residual signal groups, Ratio2_1 is a bit allocation ratio of the $i^{th}$ residual signal group, * represents a multiplication operation, and Ratio2 is a bit allocation ratio of all residual signal groups. In the foregoing solution, when there are a plurality of residual signal groups, a bit allocation ratio of each residual signal group to all residual signal groups may be determined based on a quantity of transmission channels of each residual signal group. For example, R_i/C represents a transmission channel ratio of the $i^{th}$ residual signal group to all the residual signal groups, and the bit allocation ratio of the $i^{th}$ residual signal group may be obtained based on (R_i/C) and Ratio2.

In one embodiment, the determining the bit allocation ratio of the virtual speaker signal group and the bit allocation ratio of the residual signal group according to a preset third signal group bit allocation algorithm when the energy ratio of the virtual speaker signal group is less than a preset first energy ratio threshold or the virtual speaker code identifier is not dominant includes: when directionalNrgRatio<TH3 is met, S>TH0 is met, or η<TH4 is met, calculating the bit allocation ratio of the virtual speaker signal group in the following manner: Ratio1_1=directionalNrgRatio, where directionalNrgRatio represents the energy ratio of the virtual speaker signal group, Ratio1_1 is the bit allocation ratio of the virtual speaker signal group, TH3 is the second energy ratio threshold, TH4 is the first virtual speaker coding efficiency threshold, S is the quantity of anisotropic sound sources, η represents the virtual speaker coding efficiency, and TH0 is the threshold of the quantity of anisotropic sound sources; and calculating the bit allocation ratio of the residual signal group in the following manner: Ratio2_1=D/(F+D), where Ratio2_1 is the bit allocation ratio of the residual signal group, F is the energy representation value of the virtual speaker signal group, and D is the energy representation value of the residual signal group. In the foregoing solution, it may be learned from a calculation procedure of Ratio1_1 that the bit allocation ratio of the virtual speaker signal group is equal to the energy ratio of the virtual speaker signal group. Therefore, when the bit allocation of the virtual speaker signal group is not dominant, the coder side does not allocate more bits to the virtual speaker signal group, to ensure proper bit allocation of the coder side.

In one embodiment, the method further includes: after the bit allocation ratio of the virtual speaker signal group is obtained, updating the bit allocation ratio of the virtual speaker signal group in the following manner: when Ratio1_1<groupBitsRatio1, Ratio1_2=groupBitsRatio1; and when Ratio1_1≥groupBitsRatio1, Ratio1_2=FAC5*groupBitsRatio1+(1−FAC5)*Ratio1_1, where Ratio1_2 represents an updated bit allocation ratio of the virtual speaker signal group, FAC5 is a preset fifth adjustment factor, Ratio1_1 is the bit allocation ratio that is of the virtual speaker signal group and that exists before updating, * represents a multiplication operation, and groupBitsRatio1 is a preset bit allocation ratio of the virtual speaker signal group; and after the bit allocation ratio of the residual signal group is obtained, updating the bit allocation ratio of the residual signal group in the following manner: when Ratio2_1<groupBitsRatio2, Ratio2_2=groupBitsRatio2; and when Ratio2_1≥groupBitsRatio2, Ratio2_2=FAC6*groupBitsRatio2+(1−FAC6)*Ratio2_1, where Ratio2_2 represents an updated bit allocation ratio of the residual signal group, FAC6 is a preset sixth adjustment factor, Ratio2_1 is a bit allocation ratio that is of the residual signal group and that exists before updating, * represents a multiplication operation, and groupBitsRatio2 is a preset bit allocation ratio of the residual signal group. In the foregoing solution, it may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner. It may be learned from a calculation procedure of Ratio1_2 that a secure limit is set for the bit allocation ratio of the residual signal group, and Ratio1_2 is limited within a secure bit range, so that the coder side can perform bit allocation of the residual signal group in a secure and available manner.

In one embodiment, the method further includes: separately determining a bit quantity of the virtual speaker signal group and a bit quantity of the residual signal group based on the bit allocation ratio of the virtual speaker signal group, the bit allocation ratio of the residual signal group, and a total transmission channel bit quantity; and performing bit allocation of the virtual speaker signal group based on the bit quantity of the virtual speaker signal group, and performing bit allocation of the residual signal group based on the bit quantity of the residual signal group. In the foregoing solution, the coder side performs bit allocation of the virtual speaker signal group based on the bit quantity of the virtual speaker signal group, and performs bit allocation of the residual signal group based on the bit quantity of the residual signal group, to resolve a problem that the coder side cannot perform bit allocation of the virtual speaker signal and the residual signal.

In one embodiment, the separately determining a bit quantity of the virtual speaker signal group and a bit quantity of the residual signal group based on the bit allocation ratio of the virtual speaker signal group, the bit allocation ratio of the residual signal group, and a total transmission channel bit quantity includes: calculating the bit quantity of the virtual speaker signal group in the following manner: F_bitnum=Ratio1*C_bitnum, where F_bitnum is the bit quantity of the virtual speaker signal group, Ratio1 is the bit allocation ratio of the virtual speaker signal group, and C_bitnum is the total transmission channel bit quantity; and calculating the bit quantity of the residual signal group in the following manner: D_bitnum=Ratio2*C_bitnum, where D_bitnum is the bit quantity of the residual signal group, Ratio2 is the bit allocation ratio of the residual signal group, and C_bitnum is the total transmission channel bit quantity. In the foregoing solution, the coder side may pre-determine the total transmission channel bit quantity, and a value of the total transmission channel bit quantity is not limited. The coder side may calculate the bit quantity of the virtual speaker signal group and the bit quantity of the residual signal group according to the calculation formulas, to resolve a problem that the coder side cannot perform bit allocation of the virtual speaker signal and the residual signal.

In one embodiment, the method further includes: coding the transmission channel signal, the bit allocation ratio of the virtual speaker signal group, and the bit allocation ratio of the residual signal group, and writing the coded transmission channel signal, bit allocation ratio of the virtual speaker signal group, and bit allocation ratio of the residual signal group to a bitstream. In the foregoing solution, the bit allocation ratio of the virtual speaker signal group and the bit allocation ratio of the residual signal group may be coded into the bitstream. The coder side sends the bitstream to a decoder side, and then the decoder side parses the bitstream, so that the decoder side can obtain the bit allocation ratio of the virtual speaker signal group and the bit allocation ratio of the residual signal group based on the bitstream. The decoder side may obtain the bit allocation ratio of the virtual speaker signal group and the bit allocation ratio of the residual signal group based on the bit allocation ratio of the virtual speaker signal group and the bit allocation ratio of the residual signal group, to decode the bitstream to obtain the three-dimensional audio signal.

According to a second embodiment, this application further provides a three-dimensional audio signal processing method, including: receiving a bitstream; decoding the bitstream, to obtain a bit allocation ratio of a virtual speaker signal group and a bit allocation ratio of a residual signal group; and decoding a virtual speaker signal and a residual signal in the bitstream based on the bit allocation ratio of the virtual speaker signal group and the bit allocation ratio of the residual signal group, to obtain a three-dimensional audio signal through decoding. In the foregoing solution, the bit allocation ratio of the virtual speaker signal group and the bit allocation ratio of the residual signal group may be coded into the bitstream. The coder side sends the bitstream to a decoder side, and then the decoder side parses the bitstream, so that the decoder side can obtain the bit allocation ratio of the virtual speaker signal group and the bit allocation ratio of the residual signal group based on the bitstream. The decoder side may obtain the bit allocation ratio of the virtual speaker signal group and the bit allocation ratio of the residual signal group based on the bit allocation ratio of the virtual speaker signal group and the bit allocation ratio of the residual signal group, to decode the bitstream to obtain the three-dimensional audio signal.

In one embodiment, the decoding a virtual speaker signal and a residual signal in the bitstream based on the bit allocation ratio of the virtual speaker signal group and the bit allocation ratio of the residual signal group includes: determining a quantity of available bits based on the bitstream; determining a bit quantity of the virtual speaker signal group based on the quantity of available bits and the bit allocation ratio of the virtual speaker signal group, and decoding the virtual speaker signal in the bitstream based on the bit quantity of the virtual speaker signal group; and determining a bit quantity of the residual signal group based on the quantity of available bits and the bit allocation ratio of the residual signal group, and decoding the residual signal in the bitstream based on the bit quantity of the residual signal group.

According to a third embodiment, this application further provides three-dimensional audio signal processing apparatus, including: a coding module, configured to perform spatial coding on a to-be-coded three-dimensional audio signal, to obtain a transmission channel signal and transmission channel attribute information, where the transmission channel signal includes at least one virtual speaker signal group and at least one residual signal group; and a bit allocation ratio determining module, configured to determine a bit allocation ratio of the virtual speaker signal group and a bit allocation ratio of the residual signal group based on the transmission channel attribute information.

In the third embodiment, a composition module of the three-dimensional audio signal processing apparatus may further perform operations described in the first embodiment and the possible implementations. For details, refer to the descriptions in the first embodiment and the possible implementations.

According to a fourth embodiment, this application further provides a three-dimensional audio signal processing apparatus, including: a receiving module, configured to receive a bitstream; a decoding module, configured to decode the bitstream, to obtain a bit allocation ratio of a virtual speaker signal group and a bit allocation ratio of a residual signal group; and a signal generation module, configured to decode a virtual speaker signal and a residual signal in the bitstream based on the bit allocation ratio of the virtual speaker signal group and the bit allocation ratio of the residual signal group, to obtain a three-dimensional audio signal through decoding.

In the fourth embodiment, a composition module of the three-dimensional audio signal processing apparatus may further perform operations described in the second embodiment and the possible implementations. For details, refer to the descriptions in the second embodiment and the possible implementations.

According to a fifth embodiment, this application provides a computer-readable storage medium. The computer-readable storage medium stores instructions, and when the instructions run on a computer, the computer is enabled to perform the method in the first embodiment or the second embodiment.

According to a sixth embodiment, this application provides a computer program product including instructions, and when the computer program product is run on a computer, the computer is enabled to perform the method in the first embodiment or the second embodiment.

According to a seventh embodiment, this application provides a computer-readable storage medium, including a bitstream generated in the method in the first embodiment.

According to an eighth embodiment, this application provides a communication apparatus. The communication apparatus may include an entity, for example, a terminal device or a chip. The communication apparatus includes a processor and a memory. The memory is configured to store instructions. The processor is configured to execute the instructions in the memory, so that the communication apparatus performs the method in the first embodiment or the second embodiment.

According to a ninth embodiment, this application provides a chip system. The chip system includes a processor, configured to support an audio coder or an audio decoder to implement functions in the foregoing embodiments, for example, send or process data and/or information in the foregoing methods. In one embodiment, the chip system further includes a memory. The memory is configured to store program instructions and data for the audio coder or the audio decoder. The chip system may include a chip, or may include a chip and another discrete component.

It can be learned from the foregoing technical solutions that embodiments of this application have the following advantages:

In embodiments of this application, spatial coding is performed on the to-be-coded three-dimensional audio signal, to obtain the transmission channel signal and the transmission channel attribute information, where the transmission channel signal includes the at least one virtual speaker signal group and the at least one residual signal group; and then, the bit allocation ratio of the virtual speaker signal group and the bit allocation ratio of the residual signal group are determined based on the transmission channel attribute information. In embodiments of this application, the three-dimensional audio signal is coded, to obtain the transmission channel signal and the transmission channel attribute information. The transmission channel signal may include the at least one virtual speaker signal group and the at least one residual signal group, and the transmission channel attribute information may be used to separately determine the bit allocation ratio of the virtual speaker signal group and the bit allocation ratio of the residual signal group, to resolve a problem that bit allocation of a signal cannot be determined.

DESCRIPTION OF EMBODIMENTS

Figure 1:
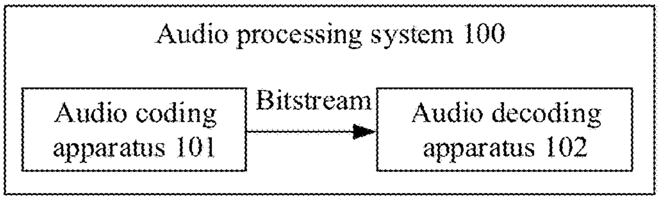
FIG. 1 is a schematic diagram of a composition structure of an audio processing system according to an embodiment of this application.

The following describes embodiments of this application with reference to the accompanying drawings.

In the specification, claims, and accompanying drawings of this application, the terms such as "first" and "second" are intended to distinguish between similar objects but do not necessarily indicate an order or sequence. It should be understood that the terms used in such a way are interchangeable in proper circumstances, and this is merely a discrimination manner for describing objects having a same attribute in embodiments of this application. In addition, the terms "include" and "have" and any other variants thereof mean to cover the non-exclusive inclusion, so that a process, method, system, product, or device that includes a series of units is not necessarily limited to those units, but may include other units not expressly listed or inherent to such a process, method, product, or device.

A sound is a continuous wave generated by an object through vibration. The object that vibrates and emits a sound wave is referred to as a sound source. In a process in which the sound wave propagates through a medium (for example, air, a solid, or a liquid), an auditory organ of a person or an animal can sense the sound.

Features of the sound wave include a tone, sound intensity, and tone quality. The tone indicates a sound level. The sound intensity indicates loudness of the sound. The sound intensity may also be referred to as loudness or a volume. A unit of the sound intensity is decibel (dB). The tone quality is also referred to as a timbre.

A frequency of the sound wave determines a pitch of the tone. A higher frequency indicates a higher tone. A quantity of times that an object vibrates in one second is referred to as a frequency, and a frequency unit is Hertz (Hz). A frequency of a sound that can be recognized by a human ear is between 20 Hz and 20000 Hz.

An amplitude of the sound wave determines the sound intensity. A larger amplitude indicates higher sound intensity. A closer distance to the sound source indicates higher sound intensity.

A waveform of the sound wave determines the tone quality. The waveform of the sound wave includes a square wave, a sawtooth wave, a sine wave, a pulse wave, and the like.

Sounds may be divided into a regular sound and an irregular sound based on features of sound waves. The irregular sound is a sound generated by the sound source through irregular vibration. The irregular sound is, for example, noise that affects people's work, learning, rest, and the like. The regular sound is a sound generated by the sound source through regular vibration. Regular sounds include a voice and a musical sound. When the sound is represented by electricity, the regular sound is an analog signal that continuously changes in time/frequency domain. The analog signal may be referred to as an audio signal (acoustic signals). The audio signal is an information carrier that carries a voice, music, and sound effect.

Because an auditory sense of a person has a capability of identifying a location distribution of a sound source in space, when a listener hears a sound in space, in addition to a tone, sound intensity, and tone quality of the sound, a direction of the sound can be felt.

As attention to and quality requirements for experience of an auditory system increase, a three-dimensional audio technology emerges, to enhance a sense of depth, a sense of presence, and a sense of space of a sound. Therefore, the listener not only senses sounds from front, back, left, and right sound sources, but also senses a feeling that space in which the listener is located is enveloped by spatial sound fields (briefly referred to as "sound field") generated by these sound sources, and a feeling that the sounds diffuse around, to create "immersive" sound effect exerted when the listener is located in a place such as a theater or a concert hall.

In the three-dimensional audio technology, space outside a human ear is assumed to be a system, and a signal received at an ear membrane is a three-dimensional audio signal output when a sound produced by a sound source is filtered by a system outside the human ear. For example, a system outside the human ear may be defined as a system impact response $h(n)$, any sound source may be defined as $x(n)$, and a signal received at the ear membrane is a convolution result of $x(n)$ and $h(n)$. The three-dimensional audio signal described in embodiments of this application may be a higher order ambisonics (HOA) signal or a first order ambisonics (FOA) signal. Three-dimensional audio may also be referred to as three-dimensional sound effect, spatial audio, three-dimensional sound field reconstruction, virtual 3D audio, binaural audio, or the like.

The sound wave propagates in an ideal medium, a wave number is $k=w/c$, and an annular frequency is $w=2\pi f$, where f is a sound wave frequency, and is a sound speed. Sound pressure p satisfies a formula (1), where $\nabla^2$ is a Laplacian operator.

$$\nabla^2 p + k^2 p = 0 \quad \text{Formula (1)}$$

It is assumed that the spatial system outside the human ear is a sphere, and the listener is at the center of the sphere. A sound transmitted from an outside of the sphere has a projection on the sphere, and a sound outside the sphere is filtered out. It is assumed that a sound source is distributed on the sphere, and a sound field generated by the sound source on the sphere fits a sound field generated by an original sound source. That is, the three-dimensional audio technology is a sound field fitting method. In one embodiment, an equation, namely, the formula (1) is solved in a spherical coordinate system. In a passive spherical area, a solution to the equation, namely, the formula (1) is the following formula (2).

$$p(r, \theta, \varphi, k) = s\sum_{m=0}^{\infty} o(2m+1) j^m j_m^{kr}(kr) \sum_{0<n\le m, \sigma=\pm1} Y_{m,n}^{\sigma}(\theta_s, \varphi_s) Y_{m,n}^{\sigma}(\theta, \varphi) \quad \text{Formula (2)}$$

Herein, r represents a sphere radius, θ represents a horizontal angle, φ represents an elevation angle, k represents a wave number, s represents an amplitude of an ideal plane wave, and m represents a sequence number of an order of the three-dimensional audio signal (or referred to as a sequence number of an order of the HOA signal).

$$j^m j_m^{kr}(kr)$$

represents a sphere Bessel function, and the sphere Bessel function is also referred to as a radial basis function, where first "j" represents an imaginary unit and $$(2m+1) j^m j_m^{kr}(kr)$$

does not change with an angle.

$$Y_{m,n}^{\sigma}(\theta, \varphi)$$

represents a spherical harmonic function in directions of θ and φ, and $$Y_{m,n}^{\sigma}(\theta_s, \varphi_s)$$

represents a spherical harmonic function in a direction of the sound source. A coefficient of the three-dimensional audio signal satisfies a formula (3).

$$B_{m,n}^{\sigma} = s \cdot Y_{m,n}^{\sigma}(\theta_s, \varphi_s) \quad \text{Formula (3)}$$

The formula (3) is substituted into the formula (2), and the formula (2) may be deformed into a formula (4).

$$p(r, \theta, \varphi, k) = \sum_{m=0}^{\infty} j^m j_m^{kr}(kr) \sum_{0\le n<m, \sigma=\pm1} B_{m,n}^{\sigma} Y_{m,n}^{\sigma}(\theta, \varphi) \quad \text{Formula (4)}$$

Herein, $$B_{m,n}^{\sigma}$$

represents an N-order coefficient of the three-dimensional audio signal, and is used to approximately describe the sound field. The sound field is an area in which a sound wave exists in a medium. N is an integer greater than or equal to 1. For example, a value range of N is an integer from 2 to 6. The coefficient of the three-dimensional audio signal in embodiments of this application may be a HOA coefficient or an ambisonic coefficient.

The three-dimensional audio signal is an information carrier that carries spatial location information of the sound source in the sound field, and describes a sound field of a listener in space. The formula (4) indicates that the sound field may be expanded on a spherical surface based on a spherical harmonic function. In other words, the sound field may be decomposed into superposition of a plurality of plane waves. Therefore, the sound field described by the three-dimensional audio signal may be expressed by using superposition of a plurality of plane waves, and the sound field may be reconstructed by using a coefficient of the three-dimensional audio signal.

Compared with a 5.1 channel audio signal or a 7.1 channel audio signal, because an N-order HOA signal has $(N+1)^2$ sound channels, the HOA signal includes a large amount of data used to describe spatial information of a sound field. If a capture device (for example, a microphone) transmits the three-dimensional audio signal to a playback device (for example, a speaker), a large bandwidth needs to be consumed. Currently, a coder may compress and code the three-dimensional audio signal in a spatial squeezed surround audio coding (S3AC) method, a directional audio coding (DirAC) method, or a coding method selected based on a virtual speaker, to obtain a bitstream, and transmit the bitstream to a playback device. The coding method selected based on the virtual speaker may also be referred to as a match projection (MP) coding method. Subsequently, the coding method selected based on the virtual speaker is used as an example for description. The playback device decodes the bitstream, reconstructs the three-dimensional audio signal, and plays the reconstructed three-dimensional audio signal, to reduce an amount of data of transmitting the three-dimensional audio signal to the playback device and occupation of a bandwidth.

For the three-dimensional audio signal, sound fields of three-dimensional audio signals cannot be classified currently. How to classify the sound fields of the three-dimensional audio signal is a technical problem to be solved in embodiments of this application. In embodiments of this application, the sound fields of the three-dimensional audio signals can be classified through linear decomposition of the three-dimensional audio signal, so that the sound fields of the three-dimensional audio signals can be accurately classified, and a sound field classification result of a current frame can be obtained.

In addition, when a current coder compresses and codes the three-dimensional audio signal, a high compression ratio cannot be obtained. Therefore, how to improve a compression ratio when three-dimensional audio signals of different sound fields are compressed and coded is another problem to be resolved in embodiments of this application.

Embodiments of this application provide an audio coding technology, and in particular, provide a three-dimensional audio coding technology oriented to a three-dimensional audio signal. In one embodiment, a coding technology in which a small quantity of sound channels represent a three-dimensional audio signal is provided, to improve a conventional audio coding system. Audio coding (or usually referred to as coding) includes audio coding and audio decoding. Audio coding is performed on a source side, including processing (for example, compressing) of original audio to reduce an amount of data required to represent the audio, to perform storage and/or transmission more efficiently. Audio decoding is performed on a destination side, including performing inverse processing relative to the coder, to reconstruct the original audio. A coding part and a decoding part are also collectively referred to as coding. The following describes implementations of embodiments of this application in detail with reference to the accompanying drawings.

The technical solutions in embodiments of this application may be applied to various audio processing systems. FIG. 1 is a schematic diagram of a composition structure of an audio processing system according to an embodiment of this application. An audio processing system 100 may include an audio coding apparatus 101 and an audio decoding apparatus 102. The audio coding apparatus 101 may be configured to generate a bitstream, and then an audio coding bitstream may be transmitted to the audio decoding apparatus 102 through an audio transmission channel. The audio decoding apparatus 102 may receive the bitstream, and then execute an audio decoding function of the audio decoding apparatus 102, to obtain a reconstructed signal.

In this embodiment of this application, the audio coding apparatus may be applied to various terminal devices having an audio communication requirement, and a wireless device and a core network device that have a transcoding requirement. For example, the audio coding apparatus may be an audio coder of the terminal device, or the wireless device or core network device. Similarly, the audio decoding apparatus may be applied to various terminal devices having an audio communication requirement, and a wireless device and a core network device that have a transcoding requirement. For example, the audio decoding apparatus may be an audio decoder of the terminal device, or the wireless device or core network device. For example, the audio coder may include a radio access network, a media gateway of a core network, a transcoding device, a media resource server, a mobile terminal, or a fixed network terminal. The audio coder may further be an audio coder applied to a virtual reality (VR) streaming media (streaming) service.

In this embodiment of this application, an audio coding module (audio coding and audio decoding) applicable to the virtual reality streaming media (VR streaming) service is used as an example. An end-to-end audio signal processing procedure includes: An audio signal A passes through a capture (acquisition) module, and then a preprocessing operation (audioPReprocessing) is performed. The preprocessing operation includes filtering out a low frequency part of the signal. Direction information in the signal may be extracted by using 20 Hz or 50 Hz as a demarcation point, coded (audio coding) and encapsulated (file/segment encapsulation), and then sent (delivery) to a decoder side. The decoder side performs decapsulation (file/segment decapsulation), performs decoding (audio decoding), and performs binaural rendering (audio rendering) processing on a decoded signal. A rendered signal is mapped to a headphone of a listener, and may be independent headphone, or may be a headphone on a glasses device.

Figure 2A:
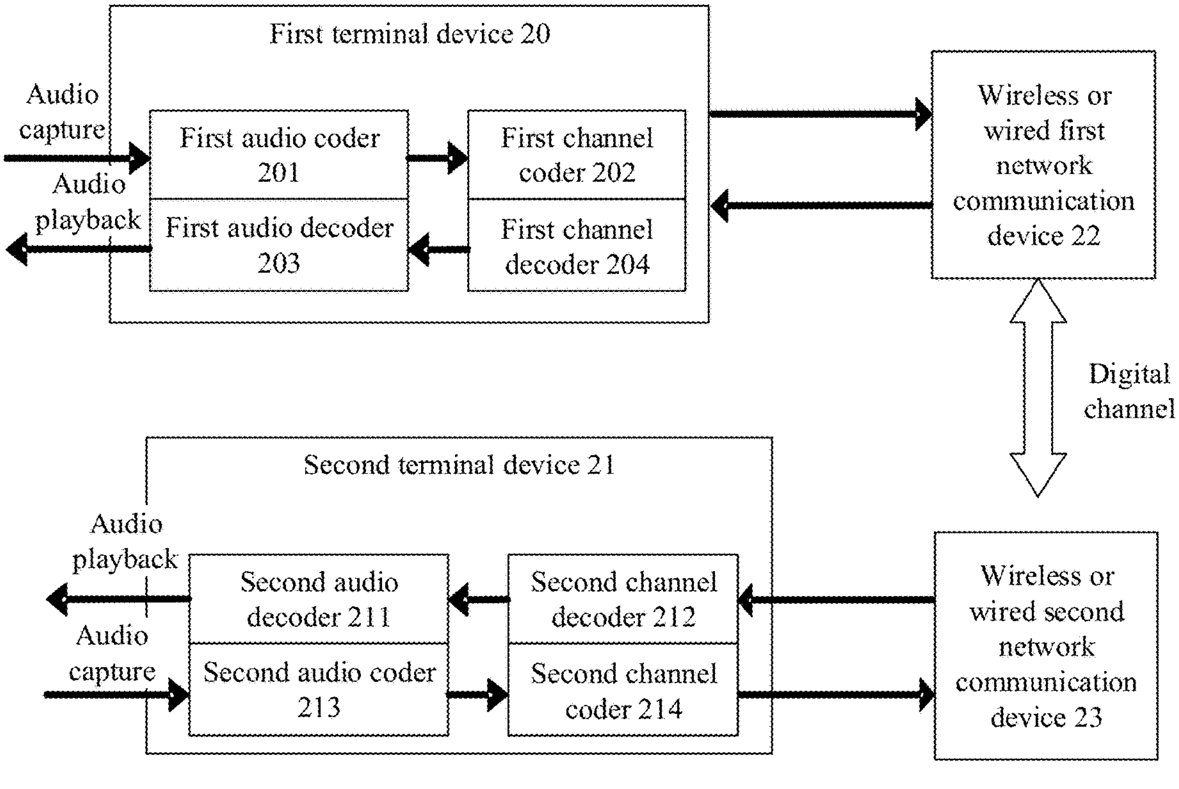
FIG. 2*a* is a schematic diagram in which an audio coder and an audio decoder are applied to a terminal device according to an embodiment of this application.

FIG. 2*a* is a schematic diagram in which an audio coder and an audio decoder are applied to a terminal device according to an embodiment of this application. Each terminal device may include an audio coder, a channel coder, an audio decoder, and a channel decoder. In one embodiment, the channel coder is configured to perform channel coding on an audio signal, and the channel decoder is configured to perform channel decoding on an audio signal. For example, a first terminal device 20 may include a first audio coder 201, a first channel coder 202, a first audio decoder 203, and a first channel decoder 204. A second terminal device 21 may include a second audio decoder 211, a second channel decoder 212, a second audio coder 213, and a second channel coder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be generally a signal transmission device, for example, a communication base station or a data switching device.

In audio communication, a terminal device serving as a transmit end performs audio capture, performs audio coding on a captured audio signal, performs channel coding, and performs transmission on the digital channel through a wireless network or a core network. A terminal device serving as a receive end performs channel decoding based on a received signal, to obtain a bitstream, and performs audio decoding to restore an audio signal. The terminal device at the receive end performs audio playback.

Figure 2B:
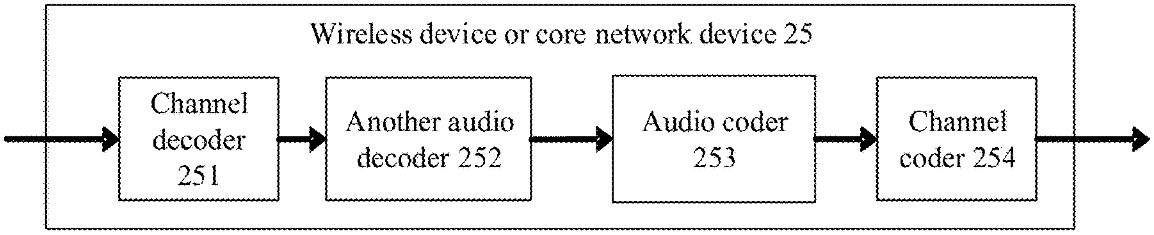
FIG. 2*b* is a schematic diagram in which an audio coder is applied to a wireless device or core network device according to an embodiment of this application.

FIG. 2*b* is a schematic diagram in which an audio coder is applied to a wireless device or core network device according to an embodiment of this application. A wireless device or core network device 25 includes a channel decoder 251, another audio decoder 252, an audio coder 253 provided in this embodiment of this application, and a channel coder 254. The another audio decoder 252 is another audio decoder different from an audio decoder. In the wireless device or core network device 25, the channel decoder 251 performs channel decoding on a signal that enters the device, the another audio decoder 252 performs audio decoding, the audio coder 253 provided in this embodiment of this application performs audio coding, and finally, the channel coder 254 performs channel coding on an audio signal, and transmits the audio signal after channel coding is completed. The another audio decoder 252 performs audio decoding on a bitstream obtained after the channel decoder 251 perform decoding.

Figure 2C:
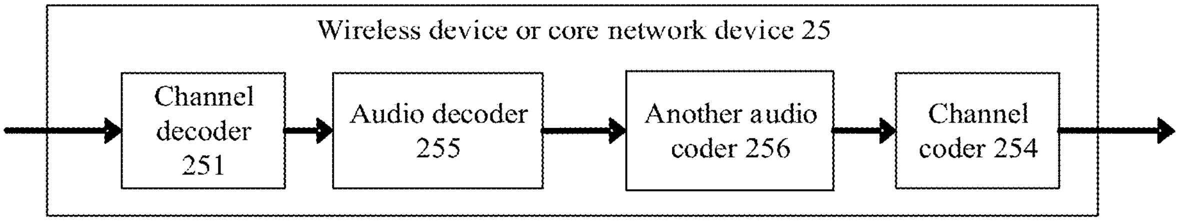
FIG. 2*c* is a schematic diagram in which an audio decoder is applied to a wireless device or core network device according to an embodiment of this application.

FIG. 2*c* is a schematic diagram in which an audio decoder is applied to a wireless device or core network device according to an embodiment of this application. A wireless device or core network device 25 includes a channel decoder 251, an audio decoder 255 provided in this embodiment of this application, another audio coder 256, and a channel coder 254. The another audio coder 256 is another audio coder different from an audio coder. In the wireless device or core network device 25, the channel decoder 251 performs channel decoding on a signal that enters the device, the audio decoder 255 decodes a received audio coding bitstream, the another audio coder 256 performs audio coding, and finally, the channel coder 254 performs channel coding on an audio signal, and transmits the audio signal after channel coding is completed. In the wireless device or core network device, if transcoding needs to be implemented, corresponding audio coding processing needs to be performed. The wireless device is a radio frequency-related device in communication, and the core network device is a core network-related device in communication.

In some embodiments of this application, the audio coding apparatus may be applied to various terminal devices having an audio communication requirement, and a wireless device and a core network device that have a transcoding requirement. For example, the audio coding apparatus may be a multi-channel coder of the terminal device, or the wireless device or core network device. Similarly, the audio decoding apparatus may be applied to various terminal devices having an audio communication requirement, and a wireless device and a core network device that have a transcoding requirement. For example, the audio decoding apparatus may be a multi-channel decoder of the terminal device, or the wireless device or core network device.

Figure 3A:
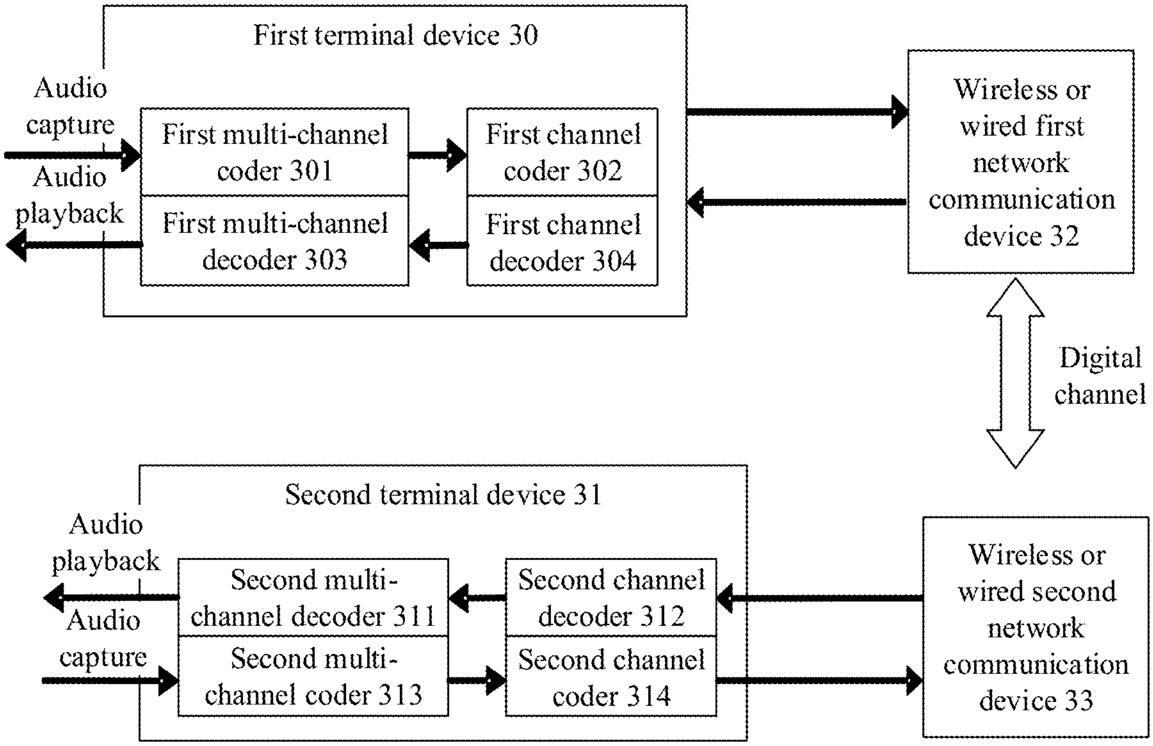
FIG. 3*a* is a schematic diagram in which a multi-channel coder and a multi-channel decoder are applied to a terminal device according to an embodiment of this application.

FIG. 3*a* is a schematic diagram in which a multi-channel coder and a multi-channel decoder are applied to a terminal device according to an embodiment of this application. Each terminal device may include a multi-channel coder, a channel coder, a multi-channel decoder, and a channel decoder. The multi-channel coder may perform an audio coding method provided in an embodiment of this application, and the multi-channel decoder may perform an audio decoding method provided in an embodiment of this application. In one embodiment, the channel coder is configured to perform channel coding on a multi-channel signal, and the channel decoder is configured to perform channel decoding on a multi-channel signal. For example, a first terminal device 30 may include a first multi-channel coder 301, a first channel coder 302, a first multi-channel decoder 303, and a first channel decoder 304. A second terminal device 31 may include a second multi-channel decoder 311, a second channel decoder 312, a second multi-channel coder 313, and a second channel coder 314. The first terminal device 30 is connected to a wireless or wired first network communication device 32, the first network communication device 32 is connected to a wireless or wired second network communication device 33 through a digital channel, and the second terminal device 31 is connected to the wireless or wired second network communication device 33. The wireless or wired network communication device may be generally a signal transmission device, for example, a communication base station or a data switching device. In audio communication, a terminal device serving as a transmit end performs multi-channel coding on a captured multi-channel signal, performs channel coding, and performs transmission on a digital channel through a wireless network or a core network. A terminal device serving as a receive end performs channel decoding based on a received signal, to obtain a multi-channel signal coding bitstream, and performs multi-channel decoding to restore the multi-channel signal. The terminal device serving as the receive end performs playback.

Figure 3B:
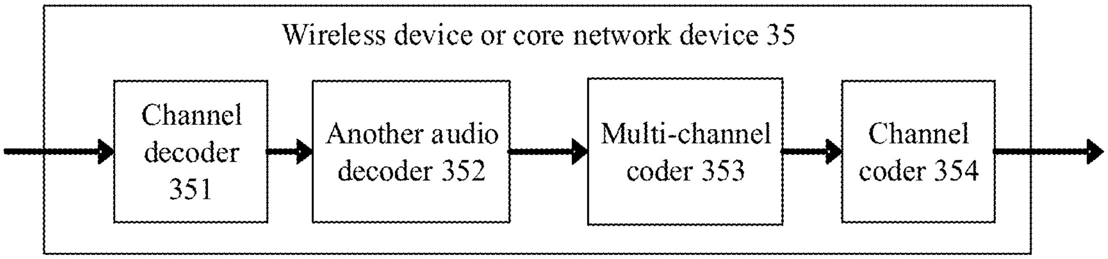
FIG. 3*b* is a schematic diagram in which a multi-channel coder is applied to a wireless device or core network device according to an embodiment of this application.

FIG. 3*b* is a schematic diagram in which a multi-channel coder is applied to a wireless device or core network device according to an embodiment of this application. A wireless device or core network device 35 includes a channel decoder 351, another audio decoder 352, a multi-channel coder 353, and a channel coder 354, which are similar to FIG. 2*b*. Details are not described herein again.

Figure 3C:
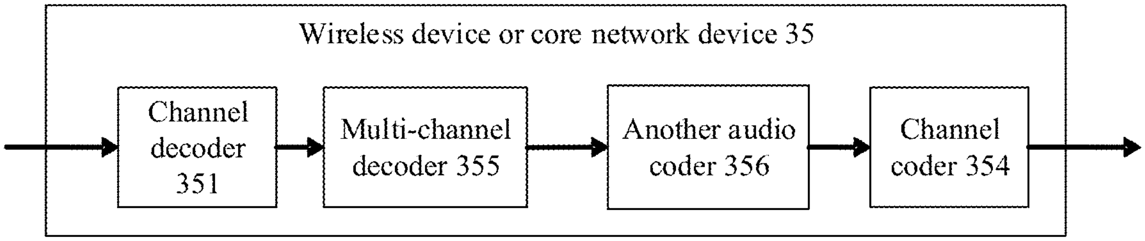
FIG. 3*c* is a schematic diagram in which a multi-channel decoder is applied to a wireless device or core network device according to an embodiment of this application.

FIG. 3*c* is a schematic diagram in which a multi-channel decoder is applied to a wireless device or core network device according to an embodiment of this application. A wireless device or core network device 35 includes a channel decoder 351, a multi-channel decoder 355, another audio decoder 356, and a channel coder 354, which are similar to FIG. 2*c*. Details are not described herein again.

Audio coding processing may be a part of a multi-channel coder, and audio decoding processing may be a part of a multi-channel decoder. For example, performing multi-channel coding on a captured multi-channel signal may be processing the captured multi-channel signal to obtain an audio signal, and then coding the obtained audio signal in the method provided in this embodiment of this application. A decoder side obtains the audio signal through decoding based on a multi-channel signal coding bitstream, and then restores the multi-channel signal after up-mixing processing. Therefore, this embodiment of this application may also be applied to a multi-channel coder and a multi-channel decoder in a terminal device, the wireless device, and the core network device. In the wireless device or core network device, if transcoding needs to be implemented, corresponding multi-channel coding processing needs to be performed.

Figure 4:
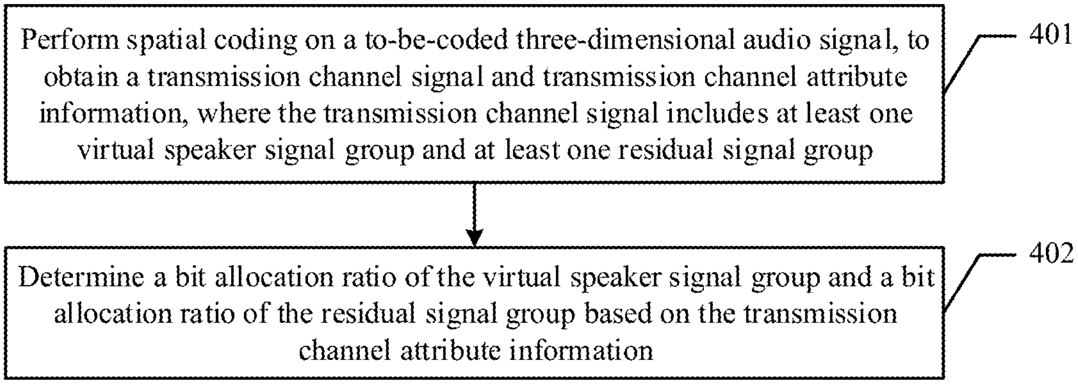
FIG. 4 is a schematic diagram of a three-dimensional audio signal processing method according to an embodiment of this application.

A three-dimensional audio signal processing method provided in an embodiment of this application is first described. The method may be performed by a terminal device. For example, the terminal device may be an audio coding apparatus (briefly referred to as a coder side or a coder below). The terminal device may alternatively be a three-dimensional audio signal processing apparatus. This is not limited. As shown in FIG. 4, the three-dimensional audio signal processing method mainly includes the following operations.

401: Perform spatial coding on a to-be-coded three-dimensional audio signal, to obtain a transmission channel signal and transmission channel attribute information, where the transmission channel signal includes at least one virtual speaker signal group and at least one residual signal group.

The coder side may obtain a three-dimensional audio signal. For example, the three-dimensional audio signal may be a scene audio signal. In one embodiment, the three-dimensional audio signal may be a time domain signal or a frequency domain signal. In addition, the three-dimensional audio signal may be a downsampled signal.

In this embodiment of the present disclosure, virtual speaker signals and virtual speakers are in a one-to-one correspondence. After virtual speakers for coding the three-dimensional audio signal are determined from a candidate virtual speaker set, virtual speaker signals corresponding to the virtual speakers may be obtained, and then the virtual speaker signals are grouped, to obtain the at least one virtual speaker signal group; or after virtual speakers for coding the three-dimensional audio signal are determined from a candidate virtual speaker set, the virtual speakers may be grouped, to obtain at least one virtual speaker group, and then a virtual speaker signal corresponding to each virtual speaker in the at least one virtual speaker group is obtained, to obtain the at least one virtual speaker signal group.

In some embodiments of this application, the three-dimensional audio signal includes a higher order ambisonics HOA signal or a first order ambisonics FOA signal. The three-dimensional audio signal may alternatively be another type of signal. This is not limited. This is merely an example of this application, and is not intended to limit this embodiment of this application.

For example, the three-dimensional audio signal may be a time domain HOA signal, or may be a frequency domain HOA signal. For another example, the three-dimensional audio signal may include all channels of the HOA signal, or may include some HOA channels (for example, FOA channels). In addition, the three-dimensional audio signal may be all sampling points of the HOA signal, or may be 1/Q downsampling points obtained after a to-be-analyzed HOA signal is downsampled. Q is a downsampling interval, and 1/Q is a downsampling rate.

In this embodiment of this application, the three-dimensional audio signal includes a plurality of frames. Processing of one frame in the three-dimensional audio signal is used as an example below. For example, if the frame is a current frame, there is a previous frame before the current frame in the three-dimensional audio signal, and there is a later frame after the current frame. In addition, in this embodiment of this application, a method for processing a frame other than the current frame in the three-dimensional audio signal is similar to a method for processing the current frame. Subsequently, processing of the current frame is used as an example.

In this embodiment of this application, after the three-dimensional audio signal is obtained, spatial coding is performed on the three-dimensional audio signal, to obtain the transmission channel signal and the transmission channel attribute information. A process of spatial coding is not in one embodiment described herein. A process of outputting the virtual speaker signal and a residual signal after spatial coding is not described again.

In this embodiment of this application, after obtaining a to-be-coded three-dimensional audio signal, the coder side may perform spatial coding on the three-dimensional audio signal, and may output a transmission channel signal and transmission channel attribute information. The transmission channel signal includes a virtual speaker signal and a residual signal. For example, virtual speaker signals are grouped, to obtain at least one virtual speaker signal group. For another example, residual signals are grouped, to obtain at least one residual signal group. In this embodiment of this application, a quantity of virtual speaker signal groups and a quantity of residual signal groups in the transmission channel signal are not limited.

In this embodiment of this application, the transmission channel attribute information corresponding to the transmission channel signal may be further output through spatial coding. The transmission channel attribute information indicates an attribute of the transmission channel signal. There are a plurality of implementations of the transmission channel attribute information. For details, refer to an example of subsequent embodiments.

In some embodiments of this application, the transmission channel attribute information includes virtual speaker coding efficiency. The virtual speaker coding efficiency represents efficiency of reconstructing the three-dimensional audio signal by using a virtual speaker for the three-dimensional audio signal. The transmission channel attribute information output by the coder (or may be the coder side) through spatial coding includes the virtual speaker coding efficiency. The following describes a method for calculating the virtual speaker coding efficiency.

The performing spatial coding on a to-be-coded three-dimensional audio signal, to obtain transmission channel attribute information in operation 401 includes:

performing signal reconstruction on the to-be-coded three-dimensional audio signal by using a virtual speaker, to obtain a reconstructed three-dimensional audio signal, where the virtual speaker that performs signal reconstruction on the to-be-coded three-dimensional audio signal may be the virtual speaker determined from the candidate virtual speaker set to code the three-dimensional audio signal;

obtaining an energy representation value of the reconstructed three-dimensional audio signal and an energy representation value of the to-be-coded three-dimensional audio signal; and obtaining the virtual speaker coding efficiency based on the energy representation value of the reconstructed three-dimensional audio signal and the energy representation value of the to-be-coded three-dimensional audio signal.

The coder side first performs signal reconstruction by using the virtual speaker, to obtain the reconstructed three-dimensional audio signal. The coder side may calculate an energy representation value of a signal on each transmission channel, for example, may obtain the energy representation value of the reconstructed three-dimensional audio signal and the energy representation value of the to-be-coded three-dimensional audio signal. An energy representation value that is of a three-dimensional audio signal and that exists before signal reconstruction is different from an energy representation value that is of the three-dimensional audio signal and that exists after signal reconstruction. Therefore, the virtual speaker coding efficiency may be calculated based on a change between the energy representation value that is of the three-dimensional audio signal and that exists before signal reconstruction is different from the energy representation value that is of the three-dimensional audio signal and that exists after signal reconstruction.

The following describes, by using an example, a method for calculating the virtual speaker coding efficiency. For example, the three-dimensional audio signal is a HOA signal. Energy representation values that are of all transmission channels of a reconstructed HOA signal and that are calculated by the coder side may be represented as R1, R2, . . . , and Rt, and energy representation values that are of all transmission channels of an original HOA signal and that are calculated by the coder side may be represented as N1, N2, . . . , and Nt. Finally, the virtual speaker coding efficiency $\eta$: $\eta = sum(R)/sum(N)$, where sum(R) represents a sum of R1 to Rt, and sum(N) represents a sum of N1 to Nt. The virtual speaker coding efficiency may be calculated according to the foregoing calculation formula.

In some embodiments of this application, the transmission channel attribute information includes an energy ratio of the virtual speaker signal group. The energy ratio of the virtual speaker signal group is a ratio of energy of all virtual speaker signals in the virtual speaker signal group to total energy of all transmission channel signals. The following describes a method for calculating the energy ratio of the virtual speaker signal group.

The method performed by the coder side further includes:

obtaining an energy representation value of the virtual speaker signal group based on an energy representation value of each virtual speaker signal in the virtual speaker signal group;

obtaining an energy representation value of the residual signal group based on an energy representation value of each residual signal in the residual signal group; and obtaining the energy ratio of the virtual speaker signal group based on the energy representation value of the virtual speaker signal group and the energy representation value of the residual signal group.

The coder side obtains the energy representation value of each virtual speaker signal in the virtual speaker signal group, and then adds energy representation values of all virtual speaker signals in a same group, to obtain the energy representation value of the virtual speaker signal group. If there are a plurality of virtual speaker signal groups, an energy representation value of each virtual speaker signal group may be calculated in the foregoing manner.

In a same manner, the coder side may obtain the energy representation value of the residual signal group based on the energy representation value of each residual signal in the residual signal group. Finally, the coder side may obtain the energy ratio of the virtual speaker signal group based on the energy representation value of the virtual speaker signal group and the energy representation value of the residual signal group. The energy ratio of the virtual speaker signal group may indicate a ratio of the virtual speaker signal group to total transmission channel signal energy. If the energy ratio of the virtual speaker signal group is high, it indicates that the energy of the virtual speaker signal group is dominant in the total transmission channel signal energy. If the energy ratio of the virtual speaker signal group is low, it indicates that the energy of the virtual speaker signal group is not dominant (that is, weak) in the total transmission channel signal energy.

In some embodiments of this application, the transmission channel attribute information includes a virtual speaker code identifier, and the virtual speaker code identifier indicates whether bit allocation of the virtual speaker signal group is dominant; and in one embodiment, the virtual speaker code identifier indicates whether bit allocation of at least one virtual speaker signal group is dominant. For example, the virtual speaker code identifier may be represented as flag. The virtual speaker code identifier may indicate that bit allocation of the virtual speaker signal group is dominant or is not dominant. Different values of the virtual speaker code identifier may indicate that the bit allocation of the virtual speaker signal group is dominant or is not dominant. Further, dominance cases may be further divided into a pre-dominance case and a sub-dominance case (that is, a slight dominance case).

The performing spatial coding on a to-be-coded three-dimensional audio signal, to obtain transmission channel attribute information includes:

performing spatial coding on the to-be-coded three-dimensional audio signal, to obtain a quantity of anisotropic sound sources of the transmission channel signal and virtual speaker coding efficiency; and obtaining the virtual speaker code identifier based on the quantity of anisotropic sound sources of the transmission channel signal and the virtual speaker coding efficiency.

The coder side may perform sound field classification on the transmission channel signal through spatial coding, and generate a sound field classification result. The sound field classification result may include the quantity of anisotropic sound sources. A calculation process of the quantity of anisotropic sound sources is not limited herein. For a manner of determining the virtual speaker coding efficiency, refer to the foregoing embodiments. Details are not described herein again. After obtaining the quantity of anisotropic sound sources of the transmission channel signal and the virtual speaker coding efficiency, the coder side obtains a value of the virtual speaker code identifier based on a determining condition met by the quantity of anisotropic sound sources of the transmission channel signal and the virtual speaker coding efficiency. In this embodiment of this application, there are a plurality of implementations of obtaining the virtual speaker code identifier. For details, refer to example descriptions in subsequent embodiments.

In some embodiments of this application, further, the obtaining the virtual speaker code identifier based on the quantity of anisotropic sound sources of the transmission channel signal and the virtual speaker coding efficiency includes:

when the quantity of anisotropic sound sources of the transmission channel signal is less than or equal to a preset threshold of the quantity of anisotropic sound sources and the virtual speaker coding efficiency is greater than or equal to a preset first virtual speaker coding efficiency threshold, determining that the virtual speaker code identifier is dominant; or when the quantity of anisotropic sound sources of the transmission channel signal is greater than a preset threshold of the quantity of anisotropic sound sources or the virtual speaker coding efficiency is less than a preset first virtual speaker coding efficiency threshold, determining that the virtual speaker code identifier is not dominant.

In this embodiment of this application, for an implementation of the threshold of the quantity of anisotropic sound sources and the first virtual speaker coding efficiency threshold, refer to an application scenario. This is not limited herein. For example, the threshold of the quantity of anisotropic sound sources may be represented as TH0, and the first virtual speaker coding efficiency threshold may be represented as TH4.

In one embodiment, that the virtual speaker code identifier is dominant indicates that the virtual speaker signal group is dominant in the total transmission channel signal. Therefore, more bits need to be allocated to the virtual speaker signal group. For example, after an initial bit ratio of the virtual speaker signal group is determined, the bit ratio may be increased. For another example, that the virtual speaker code identifier is not dominant indicates that the virtual speaker signal group is not dominant in the total transmission channel signal. In this case, a small quantity of bits may be allocated to the virtual speaker signal group. For example, after the initial bit ratio of the virtual speaker signal group is determined, the bit ratio may be reduced. In this embodiment of this application, the coder side may determine the virtual speaker code identifier by comparing the determining condition and each of the quantity of anisotropic sound sources and the virtual speaker coding efficiency, to determine the bit allocation ratio of the virtual speaker signal group and the bit allocation ratio of the residual signal group based on the virtual speaker code identifier.

Further, in some embodiments of this application, dominance includes sub-dominance or pre-dominance; and the determining that the virtual speaker code identifier is dominant includes:

when the virtual speaker coding efficiency is greater than or equal to the first virtual speaker coding efficiency threshold and the virtual speaker coding efficiency is less than or equal to a preset second virtual speaker coding efficiency threshold, determining that the virtual speaker code identifier is sub-dominant; or when the virtual speaker coding efficiency is greater than or equal to the first virtual speaker coding efficiency threshold and the virtual speaker coding efficiency is greater than a preset second virtual speaker coding efficiency threshold, determining that the virtual speaker code identifier is pre-dominant, where the second virtual speaker coding efficiency threshold is greater than the first virtual speaker coding efficiency threshold.

In one embodiment, when the quantity of anisotropic sound sources of the transmission channel signal is less than or equal to the preset threshold of the quantity of anisotropic sound sources and the virtual speaker coding efficiency is greater than or equal to the preset first virtual speaker coding efficiency threshold, it is determined that the virtual speaker code identifier is dominant. The coder side may further divide cases in which the virtual speaker code identifier is dominant, to obtain two cases: a case in which the virtual speaker code identifier is sub-dominant and a case in which the virtual speaker code identifier is pre-dominant. It can be understood that, if the virtual speaker code identifier is pre-dominant, more bits need to be allocated to the virtual speaker signal group. For example, after an initial bit ratio of the virtual speaker signal group is determined, the bit ratio may be increased. If the virtual speaker code identifier is sub-dominant, a quantity of bits less than a quantity of bits allocated when the virtual speaker code identifier is pre-dominant need to be allocated to the virtual speaker signal group. However, the quantity of bits that need to be allocated to the virtual speaker signal group still needs to be greater than a quantity of bits allocated when the virtual speaker code identifier is not dominant. For example, after an initial bit ratio of the virtual speaker signal group is determined, the bit ratio may be increased. In comparison, a bit ratio that is an increment in a case of pre-dominance is greater than a bit ratio that is an increment in a case of sub-dominance.

For example, the second virtual speaker coding efficiency threshold may be represented as TH2.

402: Determine a bit allocation ratio of the virtual speaker signal group and a bit allocation ratio of the residual signal group based on the transmission channel attribute information.

After the coder side obtains the transmission channel signal and the transmission channel attribute information, because the transmission channel attribute information carries an attribute parameter of the transmission channel signal, bit allocation of the virtual speaker signal group may be performed based on the transmission channel attribute information. In addition, bit allocation of the residual signal group may be performed based on the transmission channel attribute information. For example, the coder side determines the bit allocation ratio of the virtual speaker signal group and the bit allocation ratio of the residual signal group based on the transmission channel attribute information. The bit allocation ratio is a ratio of a quantity of allocated bits of a signal group to a total bit quantity of the transmission channel signal, and the bit allocation ratio may also be referred to as "bit allocation proportion". In this embodiment of this application, the transmission channel signal includes the at least one virtual speaker signal group and the at least one residual signal group. Therefore, the bit allocation ratio of the virtual speaker signal group and the bit allocation ratio of the residual signal group may be obtained. In subsequent embodiments, a process of determining a bit allocation ratio of one virtual speaker signal group and a bit allocation ratio of two residual signal groups is used as an example for description.

For example, in this embodiment of this application, the transmission channel signal and the transmission channel attribute information may be output through spatial coding, and a core coder obtains the transmission channel signal and the transmission channel attribute information. The core coder may obtain the bit allocation ratio of the virtual speaker signal group and the bit allocation ratio of the residual signal group based on the transmission channel signal and the transmission channel attribute information.

In some embodiments of this application, the transmission channel attribute information includes the energy ratio of the virtual speaker signal group and/or the virtual speaker code identifier; and the determining a bit allocation ratio of the virtual speaker signal group and a bit allocation ratio of the residual signal group based on the transmission channel attribute information includes:

determining the bit allocation ratio of the virtual speaker signal group and the bit allocation ratio of the residual signal group according to a preset first signal group bit allocation algorithm when the energy ratio of the virtual speaker signal group is greater than or equal to a preset first energy ratio threshold and/or the virtual speaker code identifier is pre-dominant; or determining the bit allocation ratio of the virtual speaker signal group and the bit allocation ratio of the residual signal group according to a preset second signal group bit allocation algorithm when the energy ratio of the virtual speaker signal group is greater than or equal to a preset second energy ratio threshold and less than a preset first energy ratio threshold and/or the virtual speaker code identifier is sub-dominant, where the second energy ratio threshold is less than the first energy ratio threshold; or determining the bit allocation ratio of the virtual speaker signal group and the bit allocation ratio of the residual signal group according to a preset third signal group bit allocation algorithm when the energy ratio of the virtual speaker signal group is less than a preset first energy ratio threshold or the virtual speaker code identifier is not dominant.

In this embodiment of this application, a plurality of signal group bit allocation algorithms may be preset at the coder side. When the transmission channel attribute information meets different conditions, different signal group bit allocation algorithms may be used, so that when the transmission channel attribute information meets a condition, bit allocation ratios matching the condition can be allocated to the virtual speaker signal group and the residual signal group, to improve efficiency of coding the three-dimensional audio signal by the coder side.

For example, the first energy ratio threshold may be represented as TH1, and the second energy ratio threshold may be represented as TH3.

In some embodiments of this application, the determining the bit allocation ratio of the virtual speaker signal group and the bit allocation ratio of the residual signal group according to a preset first signal group bit allocation algorithm when the energy ratio of the virtual speaker signal group is greater than or equal to a preset first energy ratio threshold and/or the virtual speaker code identifier is pre-dominant includes:

when $directionalNrgRatio \geq TH1$, and/or $S \leq TH0$ and $\eta > TH2$ are met, calculating the bit allocation ratio of the virtual speaker signal group in the following manner:

$$Ratio1\_1 = FAC1 * directionalNrgRatio + (1 - FAC1) * maxdirectionalNrgRatio,$$ where directionalNrgRatio represents the energy ratio of the virtual speaker signal group, S is the quantity of anisotropic sound sources, $\eta$ represents the virtual speaker coding efficiency, maxdirectionalNrgRatio is a preset maximum bit allocation ratio of the virtual speaker signal group, FAC1 is a preset first adjustment factor, Ratio1_1 is the bit allocation ratio of the virtual speaker signal group, * represents a multiplication operation, TH1 is the first energy ratio threshold, TH0 is the threshold of the quantity of anisotropic sound sources, and TH2 is the second virtual speaker coding efficiency threshold; and calculating the bit allocation ratio of the residual signal group in the following manner:

Ratio2=1−Ratio1_1, where

Ratio1_1 is the bit allocation ratio of the virtual speaker signal group, and Ratio2 is the bit allocation ratio of the residual signal group.

It may be learned from a calculation procedure of Ratio1_1 that the bit allocation ratio of the virtual speaker signal group is increased, and therefore, the coder side may allocate more bits to the virtual speaker signal group.

The transmission channel signal includes the virtual speaker signal group and the residual signal group. After the bit allocation ratio Ratio1_1 of the virtual speaker signal group is obtained, the bit allocation ratio of the residual signal group may be obtained according to a calculation formula of Ratio2.

It should be noted that, in this embodiment of this application, the FAC1 may be flexibly determined based on an application scenario. This is not limited herein.

In some embodiments of this application, after the bit allocation ratio of the virtual speaker signal group is obtained, the method performed by the coder side further includes:

updating the bit allocation ratio of the virtual speaker signal group in the following manner:

Ratio1_2=min(Ratio1_1, maxdirectionalNrgRatio+FAC2*Ratio1_1), where

Ratio1_2 represents an updated bit allocation ratio of the virtual speaker signal group, FAC2 is a preset second adjustment factor, maxdirectionalNrgRatio is the preset maximum bit allocation ratio of the virtual speaker signal group, Ratio1_1 is the bit allocation ratio that is of the virtual speaker signal group and that exists before updating, * represents a multiplication operation, and min is a minimization operation.

It should be noted that, in this embodiment of this application, the FAC2 may be flexibly determined based on an application scenario. This is not limited herein.

It may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner.

In some embodiments of this application, the determining the bit allocation ratio of the virtual speaker signal group and the bit allocation ratio of the residual signal group according to a preset second signal group bit allocation algorithm when the energy ratio of the virtual speaker signal group is greater than or equal to a preset second energy ratio threshold and less than a preset first energy ratio threshold and/or the virtual speaker code identifier is sub-dominant, where the second energy ratio threshold is less than the first energy ratio threshold includes:

when TH3≤directionalNrgRatio<TH1 is met, and/or S≤TH0 and TH4≤θ≤TH2 are met, calculating Ratio1_1 in the following manner:

Ratio1_1=FAC3*directionalNrgRatio+(1−FAC3)*maxdirectionalNrgRatio, where maxdirectionalNrgRatio is a preset bit allocation ratio of the virtual speaker signal group, FAC3 is a preset third adjustment factor, directionalNrgRatio represents the energy ratio of the virtual speaker signal group, S is the quantity of anisotropic sound sources, η represents the virtual speaker coding efficiency, Ratio1_1 is the bit allocation ratio of the virtual speaker signal group, * represents a multiplication operation, TH0 is the threshold of the quantity of anisotropic sound sources, TH1 is the first energy ratio threshold, TH2 is the second virtual speaker coding efficiency threshold, TH3 is the second energy ratio threshold, and TH4 is the first virtual speaker coding efficiency threshold; and calculating the bit allocation ratio of the residual signal group in the following manner:

Ratio2=1−Ratio1_1, where

Ratio1_1 is the bit allocation ratio of the virtual speaker signal group, and Ratio2 is the bit allocation ratio of the residual signal group.

It should be noted that, in this embodiment of this application, the FAC3 may be flexibly determined based on an application scenario. This is not limited herein. For example, 0≤FAC3≤0.5, FAC3>FAC1.

It may be learned from a calculation procedure of Ratio1_1 that the bit allocation ratio of the virtual speaker signal group is increased, and therefore, the coder side may allocate more bits to the virtual speaker signal group.

The transmission channel signal includes the virtual speaker signal group and the residual signal group. After the bit allocation ratio Ratio1_1 of the virtual speaker signal group is obtained, the bit allocation ratio of the residual signal group may be obtained according to a calculation formula of Ratio2.

In some embodiments of this application, after the bit allocation ratio of the virtual speaker signal group is obtained, the method provided in this embodiment of this application further includes:

updating the bit allocation ratio of the virtual speaker signal group in the following manner:

Ratio1_2=min(Ratio1_1, maxdirectionalNrgRatio+FAC4*Ratio1_1), where

Ratio1_2 represents an updated bit allocation ratio of the virtual speaker signal group, FAC4 a preset fourth adjustment factor, maxdirectionalNrgRatio is the preset maximum bit allocation ratio of the virtual speaker signal group, Ratio1_1 is the bit allocation ratio that is of the virtual speaker signal group and that exists before updating, * represents a multiplication operation, and min is a minimization operation.

It should be noted that, in this embodiment of this application, the FAC4 may be flexibly determined based on an application scenario. This is not limited herein.

It may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner.

In some embodiments of this application, the method provided in this embodiment of this application further includes:

when there are a plurality of residual signal groups, calculating a bit allocation ratio of an $i^{th}$ residual signal group in the following manner:

Ratio2_1=Ratio2*(R_i/C), where

R_i represents a quantity of transmission channels included in the it h residual signal group, C is a total quantity of transmission channels in all residual signal groups, Ratio2_1 is a bit allocation ratio of the $i^{th}$ residual signal group, * represents a multiplication operation, and Ratio2 is a bit allocation ratio of all residual signal groups.

When there are a plurality of residual signal groups, a bit allocation ratio of each residual signal group to all residual signal groups may be determined based on a quantity of transmission channels of each residual signal group. For example, R_i/C represents a transmission channel ratio of the it h residual signal group to all the residual signal groups, and the bit allocation ratio of the it h residual signal group may be obtained based on (R_i/C) and Ratio2.

In some embodiments of this application, the determining the bit allocation ratio of the virtual speaker signal group and the bit allocation ratio of the residual signal group according to a preset third signal group bit allocation algorithm when the energy ratio of the virtual speaker signal group is less than a preset first energy ratio threshold or the virtual speaker code identifier is not dominant includes:

when directionalNrgRatio<TH3 is met, S>TH0 is met, or η<TH4 is met, calculating the bit allocation ratio of the virtual speaker signal group in the following manner:

Ratio1_1=directionalNrgRatio, where directionalNrgRatio represents the energy ratio of the virtual speaker signal group, Ratio1_1 is the bit allocation ratio of the virtual speaker signal group, TH3 is the second energy ratio threshold, TH4 is the first virtual speaker coding efficiency threshold, S is the quantity of anisotropic sound sources, η represents the virtual speaker coding efficiency, and TH0 is the threshold of the quantity of anisotropic sound sources; and calculating the bit allocation ratio of the residual signal group in the following manner:

Ratio2_1=D/(F+D), where

Ratio2_1 is the bit allocation ratio of the residual signal group, F is the energy representation value of the virtual speaker signal group, and D is the energy representation value of the residual signal group.

It may be learned from a calculation procedure of Ratio1_1 that the bit allocation ratio of the virtual speaker signal group is equal to the energy ratio of the virtual speaker signal group. Therefore, when the bit allocation of the virtual speaker signal group is not dominant, the coder side does not allocate more bits to the virtual speaker signal group, to ensure proper bit allocation of the coder side.

In some embodiments of this application, the method provided in this embodiment of this application further includes:

after the bit allocation ratio of the virtual speaker signal group is obtained, updating the bit allocation ratio of the virtual speaker signal group in the following manner:

when Ratio1_1<groupBitsRatio1, Ratio1_2=groupBitsRatio1; and when Ratio1_1≥groupBitsRatio1, Ratio1_2=FAC5*groupBitsRatio1+(1−FAC5)*Ratio1_1, where Ratio1_2 represents an updated bit allocation ratio of the virtual speaker signal group, FAC5 is a preset fifth adjustment factor, Ratio1_1 is the bit allocation ratio that is of the virtual speaker signal group and that exists before updating, * represents a multiplication operation, and groupBitsRatio1 is a preset bit allocation ratio of the virtual speaker signal group; and after the bit allocation ratio of the residual signal group is obtained, updating the bit allocation ratio of the residual signal group in the following manner:

when Ratio2_1<groupBitsRatio2, Ratio2_2=groupBitsRatio2; and when Ratio2_1≥groupBitsRatio2, Ratio2_2=FAC6*groupBitsRatio2+(1−FAC6)*Ratio2_1, where Ratio2_2 represents an updated bit allocation ratio of the residual signal group, FAC6 is a preset sixth adjustment factor, Ratio2_1 is a bit allocation ratio that is of the residual signal group and that exists before updating, * represents a multiplication operation, and groupBitsRatio2 is a preset bit allocation ratio of the residual signal group.

It should be noted that, in this embodiment of this application, the FAC5 may be flexibly determined based on an application scenario. This is not limited herein.

It may be learned from a calculation procedure of Ratio1_2 that a secure limit is set for the bit allocation ratio of the virtual speaker signal group, and Ratio1_2 is limited within a secure bit range, so that the coder side can perform bit allocation of the virtual speaker signal group in a secure and available manner.

It may be learned from a calculation procedure of Ratio2_2 that a secure limit is set for the bit allocation ratio of the residual signal group, and Ratio2_2 is limited within a secure bit range, so that the coder side can perform bit allocation of the residual signal group in a secure and available manner.

In some embodiments of this application, in addition to the operations performed by the coder side in this embodiment of this application, the method provided in this embodiment of this application further includes the following operations:

separately determining a bit quantity of the virtual speaker signal group and a bit quantity of the residual signal group based on the bit allocation ratio of the virtual speaker signal group, the bit allocation ratio of the residual signal group, and a total transmission channel bit quantity; and performing bit allocation of the virtual speaker signal group based on the bit quantity of the virtual speaker signal group, and performing bit allocation of the residual signal group based on the bit quantity of the residual signal group.

After the coder side obtains the bit allocation ratio of the virtual speaker signal group and the bit allocation ratio of the residual signal group, the coder side may separately perform bit allocation of the virtual speaker signal group and the residual signal group, to determine a bit allocation result of the virtual speaker signal group and a bit allocation result of the residual signal group. For example, the coder side obtains the bit allocation ratio of the virtual speaker signal group and the bit allocation ratio of the residual signal group, and then separately determines the bit quantity of the virtual speaker signal group and the bit quantity of the residual signal group based on the total bit quantity of transmission channel. The bit quantity of the virtual speaker signal group represents a quantity of bits that may be actually allocated by the coder side to the virtual speaker signal group, and the bit quantity of the residual signal group represents a quantity of bits that may be actually allocated by the coder side to the residual signal group. Finally, the coder side performs bit allocation of the virtual speaker signal group based on the bit quantity of the virtual speaker signal group, and performs bit allocation of the residual signal group based on the bit quantity of the residual signal group, to resolve a problem that the coder side cannot perform bit allocation of the virtual speaker signal and the residual signal.

Further, in some embodiments of this application, the separately determining a bit quantity of the virtual speaker signal group and a bit quantity of the residual signal group based on the bit allocation ratio of the virtual speaker signal group, the bit allocation ratio of the residual signal group, and a total transmission channel bit quantity includes:

calculating the bit quantity of the virtual speaker signal group in the following manner:

F_bitnum=Ratio1*C_bitnum, where

F_bitnum is the bit quantity of the virtual speaker signal group, Ratio1 is the bit allocation ratio of the virtual speaker signal group, and C_bitnum is the total transmission channel bit quantity; and calculating the bit quantity of the residual signal group in the following manner:

D_bitnum=Ratio2*C_bitnum, where

D_bitnum is the bit quantity of the residual signal group, Ratio2 is the bit allocation ratio of the residual signal group, and C_bitnum is the total transmission channel bit quantity.

In one embodiment, the coder side may pre-determine the total transmission channel bit quantity, and a value of the total transmission channel bit quantity is not limited. The coder side may calculate the bit quantity of the virtual speaker signal group and the bit quantity of the residual signal group according to the calculation formulas, so that the coder side can perform bit allocation of the virtual speaker signal and the residual signal.

The foregoing calculation formulas are merely a possible manner, and are not intended to limit this embodiment of this application. This is not limited. For example, the bit quantity of the virtual speaker signal group and the bit quantity of the residual signal group are calculated according to the formulas, and the bit quantity of the virtual speaker signal group and the bit quantity of the residual signal group may be adjusted based on a preset adjustment factor, to obtain a final value. The foregoing calculation process is not limited.

In some embodiments of this application, in addition to the operations performed by the coder side, the method performed by the coder side may further include the following operations:

coding the transmission channel signal, the bit allocation ratio of the virtual speaker signal group, and the bit allocation ratio of the residual signal group, and writing the coded transmission channel signal, bit allocation ratio of the virtual speaker signal group, and bit allocation ratio of the residual signal group to a bitstream.

The bit allocation ratio of the virtual speaker signal group and the bit allocation ratio of the residual signal group may be coded into the bitstream. The coder side sends the bitstream to a decoder side, and then the decoder side parses the bitstream, so that the decoder side can obtain the bit allocation ratio of the virtual speaker signal group and the bit allocation ratio of the residual signal group based on the bitstream. The decoder side may obtain the bit allocation ratio of the virtual speaker signal group and the bit allocation ratio of the residual signal group based on the bit allocation ratio of the virtual speaker signal group and the bit allocation ratio of the residual signal group, to decode the bitstream to obtain the three-dimensional audio signal.

In some embodiments of this application, the coding the transmission channel signal, the bit allocation ratio of the virtual speaker signal group, and the bit allocation ratio of the residual signal group may in one embodiment include: directly coding the transmission channel signal; or processing the transmission channel signal, and coding the virtual speaker signal and the residual signal after obtaining the virtual speaker signal and the residual signal. For example, the coder side may be in one embodiment a core coder, and the core coder codes the virtual speaker signal, the residual signal, the bit allocation ratio of the virtual speaker signal group, and the bit allocation ratio of the residual signal group, to obtain the bitstream. The bitstream may also be referred to as an audio signal coding bitstream.

Figure 5:
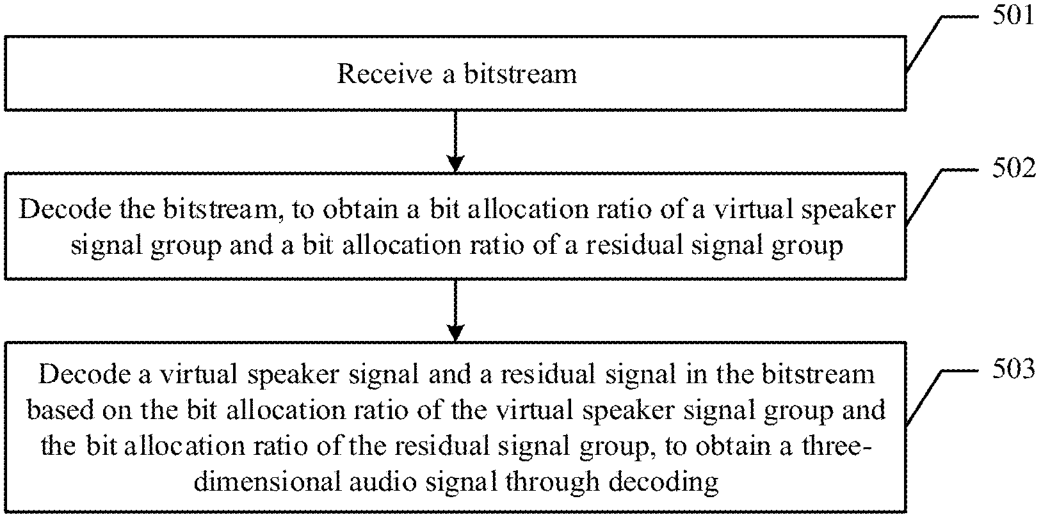
FIG. 5 is a schematic diagram of a three-dimensional audio signal processing method according to an embodiment of this application.

A three-dimensional audio signal processing method provided in embodiments of this application may include an audio coding method and an audio decoding method. The audio coding method is performed by an audio coding apparatus, the audio decoding method is performed by an audio decoding apparatus, and the audio coding apparatus and the audio decoding apparatus may communicate with each other. The method in FIG. 4 is performed by the audio coding apparatus. The following describes a three-dimensional audio signal processing method performed by the audio decoding apparatus (briefly referred to as a decoder side subsequently) in an embodiment of this application. As shown in FIG. 5, the following operations are mainly performed.

501: Receive a bitstream.

A decoder side receives a bitstream from a coder side. The bitstream carries a bit allocation ratio of a virtual speaker signal group and a bit allocation ratio of a residual signal group.

502: Decode the bitstream, to obtain the bit allocation ratio of the virtual speaker signal group and the bit allocation ratio of the residual signal group.

The decoder side parses the bitstream, to obtain the bit allocation ratio of the virtual speaker signal group and the bit allocation ratio of the residual signal group from the bitstream. The bit allocation ratio of the virtual speaker signal group and the bit allocation ratio of the residual signal group are obtained by the coder side based on the embodiment shown in FIG. 4.

503: Decode a virtual speaker signal and a residual signal in the bitstream based on the bit allocation ratio of the virtual speaker signal group and the bit allocation ratio of the residual signal group, to obtain a three-dimensional audio signal through decoding.

After the decoder side obtains the bit allocation ratio of the virtual speaker signal group and the bit allocation ratio of the residual signal group, the decoder side parses the bitstream based on the bit allocation ratio of the virtual speaker signal group and the bit allocation ratio of the residual signal group, to obtain the three-dimensional audio signal through decoding. A process of decoding the virtual speaker signal and the residual signal in the bitstream is not limited in this embodiment of this application. In this embodiment of this application, the decoder side may determine, based on the bit allocation ratio of the virtual speaker signal group and the bit allocation ratio of the residual signal group, a quantity of allocated bits of the virtual speaker signal and a quantity of allocated bits of the residual signal. The decoder side performs decoding in a decoding manner corresponding to a coding manner of the coder side, to obtain a three-dimensional audio signal sent by the coder side, and implement transmission of the three-dimensional audio signal from the coder side to the decoder side.

For example, the decoder side can determine the quantity of allocated bits of the virtual speaker signal and the quantity of allocated bits of the residual signal based on the bit allocation ratio of the virtual speaker signal group and the bit allocation ratio of the residual signal group that are transmitted in the bitstream, to resolve a problem that the decoder side cannot determine an allocated bit of a signal.

In some embodiments of this application, the decoding a virtual speaker signal and a residual signal in the bitstream based on the bit allocation ratio of the virtual speaker signal group and the bit allocation ratio of the residual signal group in operation 503 includes:

- determining a quantity of available bits based on the bitstream;
- determining a bit quantity of the virtual speaker signal group based on the quantity of available bits and the bit allocation ratio of the virtual speaker signal group, and decoding the virtual speaker signal in the bitstream based on the bit quantity of the virtual speaker signal group; and
- determining a bit quantity of the residual signal group based on the quantity of available bits and the bit allocation ratio of the residual signal group, and decoding the residual signal in the bitstream based on the bit quantity of the residual signal group.

The decoder side first determines a quantity of available bits. The quantity of available bits is a total quantity of bits that can be allocated to a transmission channel. The decoder side may obtain the bit allocation ratio of the virtual speaker signal group by parsing the bitstream, so that the bit quantity of the virtual speaker signal group can be determined based on the quantity of available bits and the bit allocation ratio of the virtual speaker signal group. The bit quantity of the virtual speaker signal group is a quantity of bits used when the coder side codes the virtual speaker signal group. The decoder side may also decode the virtual speaker signal in the bitstream based on the bit quantity of the virtual speaker signal group, so that the decoder side can obtain the virtual speaker signal from the bitstream through decoding.

Similarly, the decoder side may obtain the bit allocation ratio of the residual signal group by parsing the bitstream, so that the bit quantity of the residual signal group can be determined based on the quantity of available bits and the bit allocation ratio of the residual signal group. The bit quantity of the residual signal group is a quantity of bits used when the coder side codes the residual signal group. The decoder side may also decode the residual signal in the bitstream based on the bit quantity of the residual signal group, so that the decoder side can obtain the residual signal from the bitstream through decoding.

For example, in a decoding process executed by the decoder side, the following two parameters may be parsed out from the bitstream: groupBitsRatio and bitsRatio. Herein, groupBitsRatio occupies four bits and represents an inter-group bit allocation ratio parameter, and the inter-group bit allocation ratio parameter includes the bit allocation ratio of the virtual speaker signal group and the bit allocation ratio of the residual signal group. Herein, bitsRatio occupies four bits and represents an intra-group bit allocation ratio parameter, and the intra-group bit allocation ratio parameter includes a bit allocation ratio of each virtual speaker signal group to all virtual speaker signal groups and a bit allocation ratio of each residual signal group to all residual signal groups.

For example, the decoder side may include a bit allocation module. A main function of the bit allocation module is to allocate, to each transmission channel based on the bit allocation ratio parameter obtained from the bitstream through decoding, available bits remained after other edge information is removed. Coding of the other edge information also occupies a quantity of bits.

First, a quantity of available bits remained after the other edge information is removed from a current frame needs to be calculated, and is denoted as availableBits. A general algorithm for calculating availableBits is represented in the following manner:

$$\text{availableBits}=\text{bitsPerFrame}-\text{bitsUsed}.$$

Herein, bitsPerFrame is an initial quantity of bits per frame, and bitsUsed is a quantity of bits occupied before bit allocation.

A calculation process of HOA bit allocation HoaSplitBytesGroup( ) is as follows:

First, a quantity of bits per group of channels groupBytes is calculated based on a total quantity of available bits availableBits and groupBitsRatio, as shown in the following formula:

$$groupBytes = availableBits \cdot groupBitsRatio / \sum_{0}^{nTotalChanGroups-1} groupBitsRatio$$

Herein $$\text{groupBitsRatio}/\sum_{0}^{nTotalChanGroups-1}$$

groupBitsRatio may represent a bit allocation ratio of the virtual speaker signal group to all transmission channel signals, or may represent a bit allocation ratio of the residual signal group to all the transmission channel signals.

Then, a quantity of bits of each channel bytesChannels is calculated based on bitsRatio, as shown in the following formula:

$$bytesChannels = groupBytes \cdot bitsRatio / \sum_{0}^{groupChans[groupIdx]-1} bitsRatio$$

For example, groupBytes represents a total quantity of allocated bits of the virtual speaker signal group.

Herein, $$\text{bitsRatio}/\sum_{0}^{groupChans[groupIdx]-1}$$

bitsRatio represents a bit allocation ratio of each virtual speaker signal group to all virtual speaker signal groups, and bytesChannels represents a bit quantity of each virtual speaker signal group.

For another example, groupBytes represents a total quantity of allocated bits of the residual signal group.

Herein, $$\text{bitsRatio}/\sum_{0}^{groupChans[groupIdx]-1}$$

bitsRatio represents a bit allocation ratio of each residual signal group to all residual signal groups, and bytesChannels represents a bit quantity of each residual signal group.

The quantity of bits of each channel may be calculated based on the foregoing process.

It should be noted that, the decoder side may also calculate the bit allocation ratio of the virtual speaker signal group and the bit allocation ratio of the residual signal group in a method similar to that of the coder side. For example, the foregoing calculation procedures of Ratio1 and Ratio2 are used. Details are not described herein again.

To better understand and implement the foregoing solutions in this embodiment of this application, the following provides descriptions by using a corresponding application scenario.

In this embodiment of this application, that the three-dimensional audio signal is a HOA signal is used as an example. This embodiment of this application provides a bit allocation method for a virtual speaker signal and a residual signal. Virtual speaker signals and residual signals are grouped, an inter-group bit allocation ratio is obtained based on a signal feature and a sound field feature, and channel bit allocation is implemented.

This embodiment of this application aims to obtain a bit allocation result of a transmission channel signal. The transmission channel signal includes a virtual speaker signal and a residual signal. In this embodiment of this application, transmission channel signals are grouped into a virtual speaker signal group and a residual signal group.

The inter-group bit allocation ratio is obtained based on the signal feature and the sound field feature, and the bit quantity of the virtual speaker signal group and the bit quantity of the residual signal group are obtained based on a total bit quantity. When the coder performs coding at a rate, a total quantity of allocated bits of each frame is determined. In this embodiment of this application, bit allocation is performed based on a quantity of available bits of the frame. For example, at a constant bitrate (CBR) mode, a bitrate is 384 kbps. In this case, a bit quantity of each frame is approximately 7680 bits, and an actual quantity of available bits is less than 7680 bits. In this embodiment of this application, the available bits that are less than 7680 bits may be allocated.

When the virtual speaker coding efficiency is high, for example, when the quantity of anisotropic sound sources is less than or equal to a quantity of transmission channels of the virtual speaker signal, a quantity of coded bits of the virtual speaker signal needs to be increased by increasing an inter-group bit allocation ratio of the virtual speaker signal group.

In the foregoing calculation manner, the quantity of coded bits of the virtual speaker signal and a quantity of coded bits of the residual signal can satisfy an actual situation of sound field classification of a current frame, to resolve a problem that the quantity of coded bits of the virtual speaker signal and the quantity of coded bits of the residual signal need to be determined when the current frame is coded.

In embodiments of this application, for a core codec, the following describes an execution procedure of the core codec.

Figure 6:
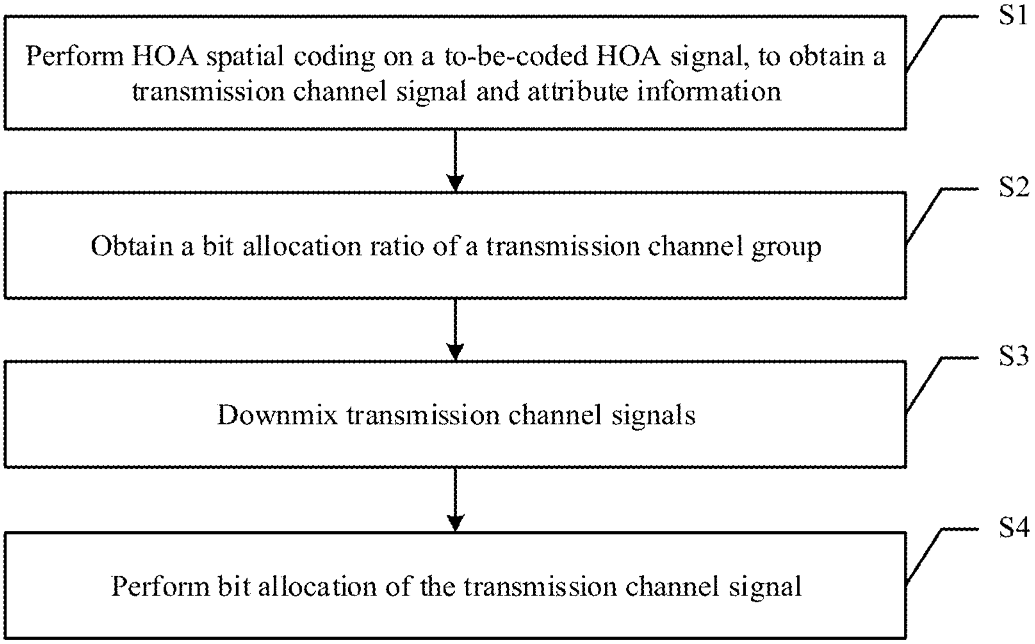
FIG. 6 is a schematic diagram of an application scenario of a three-dimensional audio signal according to an embodiment of this application.

Refer to FIG. 6. The following provides implementation operations.

S1: Perform HOA spatial coding on a to-be-coded HOA signal, to obtain a transmission channel signal and attribute information.

The transmission channel signal includes a virtual speaker signal and a residual signal.

The attribute information is the foregoing transmission single-channel attribute information, and includes a sound field classification result and virtual speaker coding efficiency $\eta$.

In some embodiments of this application, the sound field classification result includes a quantity of anisotropic sound sources, or the sound field classification result includes a quantity of anisotropic sound sources and a sound field type. The virtual speaker coding efficiency $\eta$ represents efficiency of reconstructing a HOA signal by using a virtual speaker in a current frame.

The following provides a method for calculating the virtual speaker coding efficiency:

calculating energy representation values R1, R2, . . . , and Rt of all channels of a reconstructed HOA signal, where Rt=norm(SRt), norm( ) is a norm operation, SRt is a modified discrete cosine transform MDCT coefficient of a $t^{th}$ channel of the reconstructed HOA signal, and t is $(\text{HOA order}+1)^2$; and calculating energy representation values N1, N2, . . . , and Nt of an original HOA signal, where Nt=norm (SNt), norm( ) is a norm operation, SNt is an MDCT coefficient of a $t^{th}$ channel of the original HOA signal, and t is $(\text{HOA order}+1)^2$, where the virtual speaker coding efficiency: $\eta$=sum(R)/sum(N), where sum(R) represents a sum of R1 to Rt, and sum(N) represents a sum of N1 to Nt.

S2: Obtain a bit allocation ratio of a transmission channel group.

First, transmission channel signals are grouped. It is assumed that the transmission channel signals include M virtual speaker signals and N residual signals. Further, the N residual signals may be grouped into K groups. If the M virtual speaker signals are grouped into one group, transmission channels are grouped into K+1 groups. Quantities of channels in all groups may be the same or may be different, and all frames may have same or different groups. This does not affect a subsequent procedure in this embodiment of this application.

Subsequently, that K is equal to 2 is used as an example. A value of K may be 3 or another value. This is not limited herein.

That a quantity of transmission channels is 11 is used as an example. A quantity of virtual speakers included in a virtual speaker signal group is equal to 2, a quantity of residual signals included in a residual signal group 1 is equal to 4, and a quantity of residual signals included in a residual signal group 2 is equal to 5.

Operation S2 includes operations S21 to S23.

S21: Calculate an energy representation value of each group.

The energy representation values of all the channels may be calculated in the method in S1, and then, energy representation values of channels in each group are added to obtain the energy representation value of each group. For example, an energy representation value of the virtual speaker signal group is F, an energy representation value of the residual signal group 1 is D1, and an energy representation value of the residual signal group 2 is D2.

S22: Calculate an energy ratio of the virtual speaker signal group directionalNrgRatio. directionalNrgRatio=F/(F+D1+D2).

S23: Determine a bit allocation ratio of a transmission channel group.

The bit allocation ratio of the transmission channel group is determined based on at least one of the energy ratio of the virtual speaker signal group directionalNrgRatio and/or a virtual speaker code identifier Flag. It is assumed that a bit allocation ratio of the virtual speaker signal group is Ratio1, a bit allocation ratio of the residual signal group 1 is Ratio2, and a bit allocation ratio of the residual signal group 2 is Ratio3. When it is determined, based on the energy ratio of the virtual speaker signal group directionalNrgRatio and/or the virtual speaker coding efficiency (I, that bit allocation of a virtual speaker signal group of the current frame is dominant, the bit allocation ratio of the virtual speaker signal group needs to be increased, and a bit allocation ratio of a residual signal group is reduced. The bit allocation ratio of the virtual speaker signal group may be increased by selecting different adjustment manners in different preset conditions.

A determining condition includes the energy ratio of the virtual speaker signal group directionalNrgRatio and/or the virtual speaker code identifier Flag.

The virtual speaker code identifier Flag is obtained in the following method:

when the quantity of anisotropic sound sources is less than or equal to TH0 and Virtual speaker coding efficiency $\eta$>TH2 are met, Flag=pre-dominant (High); or when the quantity of anisotropic sound sources is less than or equal to TH0 and TH4≤Virtual speaker coding efficiency $\eta$≤TH2 are met, Flag=sub-dominant (Middle); or when the quantity of anisotropic sound sources is less than or equal to TH0 and TH4≤Virtual speaker coding efficiency $\eta$≤TH2 are not met, Flag=not dominant (Low).

The following provides example descriptions of the determining condition. For example, the determining condition may include Condition 1 to Condition 6.

Condition 1: When directionalNrgRatio≥TH1 is met, 0.9≤TH1≤1. For example, TH1=0.9375.

First, the bit allocation ratio Ratio1 of the virtual speaker signal group is calculated.

$$\text{Ratio1}=FAC1*\text{directionalNrgRatio}+(1-FAC1)*\text{maxdirectionalNrgRatio}.$$

Herein, maxdirectionalNrgRatio is a preset maximum bit allocation ratio of the virtual speaker signal group, FAC1 is a preset first adjustment factor, and 0≤FAC1≤0.5.

In one embodiment, a secure bit is limited for Ratio1. An example is as follows:

$$\text{Ratio1}=\min(\text{Ratio1},\text{maxdirectionalNrgRatio}+FAC2*\text{Ratio1}).$$

Herein, FAC2 is a preset second adjustment factor, and 0≤FAC2≤0.5.

Then, the bit allocation ratio Ratio2 of the residual signal group 1 and the bit allocation ratio Ratio3 of the residual signal group 2 are calculated:

Ratio2=(1−Ratio1)*Quantity of channels in the residual signal group 1/(Quantity of channels in the residual signal group 1+Quantity of channels in the residual signal group 2); and Ratio3=(1−Ratio1)*Quantity of channels in the residual signal group 2/(Quantity of channels in the residual signal group 1+Quantity of channels in the residual signal group 2).

Condition 2: When the quantity of anisotropic sound sources is less than or equal to TH0 and Virtual speaker coding efficiency $\eta$>TH2 are met, that is, Flag=High, TH0 is a quantity of virtual speakers matching the codec or a quantity of virtual speaker signals of the codec. For example, TH0=2, and 0.8≤TH1≤1. For example, TH2=0.875. It may be considered that bit allocation of the virtual speaker signal group is pre-dominant. In this case, the bit allocation ratio of the transmission channel group is adjusted as follows:

An operation of calculating Ratio1, Ratio2, and Ratio3 is the same as Condition 1.

Condition 3: When TH3≤directionalNrgRatio<TH1 is met, 0.5≤TH3≤0.9. For example, TH3=0.75.

First, the bit allocation ratio Ratio1 of the virtual speaker signal group is calculated:

$$\text{Ratio1}=FAC3*\text{directionalNrgRatio}+(1-FAC3)*\text{maxdirectionalNrgRatio}.$$

Herein, maxdirectionalNrgRatio is the preset bit allocation ratio of the virtual speaker signal group, FAC3 is a preset third adjustment factor, 0≤FAC3≤0.5, and FAC3>FAC1.

In one embodiment, a secure bit is limited for Ratio1. An example is as follows:

$$\text{Ratio1}=\min(\text{Ratio1},\text{maxdirectionalNrgRatio}+TH8FAC4*\text{Ratio1}).$$

FAC4 is a preset fourth adjustment factor, 0≤FAC4≤0.5, and FAC4<FAC2.

Then, the bit allocation ratio Ratio2 of the residual signal group 1 and the bit allocation ratio Ratio3 of the residual signal group 2 are calculated:

Ratio2=(1−Ratio1)*Quantity of channels in residual signal group 1/(Quantity of channels in residual signal group 1+Quantity of channels in residual signal group 2); and Ratio3=(1−Ratio1)*Quantity of channels in residual signal group 2/(Quantity of channels in residual signal group 1+Quantity of channels in residual signal group 2).

Condition 4: When the quantity of anisotropic sound sources is less than or equal to TH0 and TH4≤Virtual speaker coding efficiency $\eta$<TH2 are met, that is, Flag=Middle, 0.5≤TH4≤0.8, for example, TH4=0.6875. It may be considered that bit allocation of the virtual speaker signal group is slightly dominant. In this case, the bit allocation ratio of the transmission channel group is adjusted as follows:

An operation of calculating Ratio1, Ratio2, and Ratio3 is the same as Condition 3.

Condition 5: When directionalNrgRatio<TH3 is met, it may be considered that bit allocation of the residual signal group is dominant. In this case, the bit allocation ratio of the transmission channel group is adjusted as follows:

Ratio1=directionalNrgRatio;

Ratio2=D1/(F+D1+D2); and

Ratio3=D2/(F+D1+D2).

In one embodiment, secure bits are limited for Ratio1, Ratio2, and Ratio3. Examples are as follows:

when Ratio1<groupBitsRatio1, Ratio1=groupBitsRatio1; when Ratio1≥groupBitsRatio1, Ratio1=FAC5*groupBitsRatio1+(1−FAC5)*Ratio1, when Ratio2<groupBitsRatio2, Ratio2=groupBitsRatio2; when Ratio2≥groupBitsRatio2, Ratio2=FAC6*groupBitsRatio2+(1−FAC6)*Ratio2;

when Ratio3<groupBitsRatio3, Ratio3=groupBitsRatio3; or when Ratio3≥groupBitsRatio3, Ratio3=FAC7*groupBitsRatio3+(1−FAC7)*Ratio3.

Herein, groupBitsRatio1, groupBitsRatio2, and groupBitsRatio3 are respectively a preset bit allocation ratio of the virtual speaker signal group, a preset bit allocation ratio of the residual signal group 1, a preset bit allocation ratio of the residual signal group 2, FAC5 is a preset fifth adjustment factor, 0.5<FAC5≤1, FAC6 is a preset sixth adjustment factor, 0.5<FAC6≤1, FAC7 is a preset seventh adjustment factor, 0.5<FAC7≤1, and FAC5, FAC6, and FAC7 may be equal or unequal.

Condition 6: When the quantity of anisotropic sound sources is greater than TH0 or Virtual speaker coding efficiency $\eta$<TH4 are met, that is, Flag=Low, it may be considered that bit allocation of the residual signal group is dominant. In this case, the bit allocation ratio of the transmission channel group is adjusted as follows:

An operation of calculating Ratio1, Ratio2, and Ratio3 is the same as Condition 5.

After Ratio1, Ratio2, and Ratio3 are obtained, Ratio1, Ratio2, and Ratio3 may be quantized and written to a bitstream.

S3: Downmix transmission channel signals.

A process of downmixing the transmission channel signals is not described again. An original channel signal is calculated based on a downlink mixing algorithm, to obtain a downlink mixing channel, and then bit allocation is performed. Operation S3 may be an optional operation, and operation S3 may be performed before operation S2 or after operation S2.

S4: Perform bit allocation of the transmission channel signal.

First, a bit quantity of each group is determined based on the inter-group bit allocation ratio in operation S2 and the total quantity of available bits. Examples are as follows:

Bit quantity of the virtual speaker signal group=Ratio1*Total quantity of available bits.

Bit quantity of the residual signal group 1=Ratio2*Total quantity of available bits. Bit quantity of the residual signal group 2=Ratio3*Total quantity of available bits.

Then, there may be a plurality of implementations in which a bit quantity of each channel may be determined. For example, bit allocation is performed based on an energy ratio of each channel.

The following describes a signal decoding procedure executed by a decoder side.

The decoder side receives a bitstream sent by a coder side, parses out Ratio1, Ratio2, and Ratio3 from the bitstream, and may perform bit allocation of a transmission channel signal. For example, bit allocation of the transmission channel signal may be performed in a method for obtaining a quantity of bits of each channel in operation S4.

Based on the foregoing example descriptions, in this embodiment of this application, the coder side may group transmission channels, and determine a group bit allocation ratio based on energy of a virtual speaker signal group, a quantity of anisotropic sound sources, and a reconstructed HOA signal. In this embodiment of this application, an inter-group allocation ratio may be adjusted based on the foregoing plurality of conditions. Therefore, in this embodiment of this application, transmission channel bit allocation efficiency can be effectively improved.

In this embodiment of this application, the decoding procedure executed by the decoder side is not described in detail.

It should be noted that, for ease of description, the method embodiments are described as a series of action combinations. However, a person skilled in the art should understand that this application is not limited to the described action order, because according to this application, some operations may be performed in another sequence or simultaneously. In addition, a person skilled in the art should also understand that the embodiments described in this specification are all preferred embodiments, and involved actions and modules are not necessarily required by this application.

To better implement the solutions in embodiments of this application, the following further provides a related apparatus configured to implement the foregoing solutions.

Figure 7:
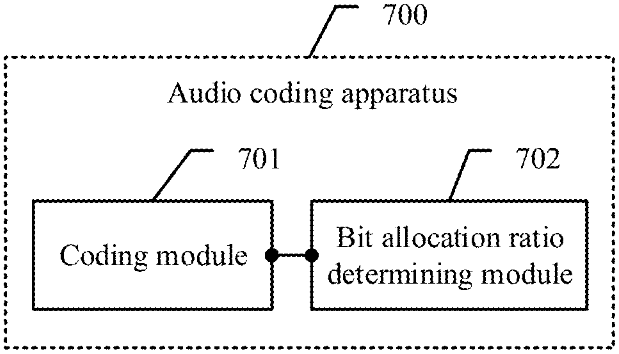
FIG. 7 is a schematic diagram of a composition structure of an audio coding apparatus according to an embodiment of this application.

FIG. 7 shows a three-dimensional audio signal processing apparatus provided in an embodiment of this application. For example, the three-dimensional audio signal processing apparatus is in one embodiment an audio coding apparatus 700, and may include a coding module 701 and a bit allocation ratio determining module 702.

The coding module is configured to perform spatial coding on a to-be-coded three-dimensional audio signal, to obtain a transmission channel signal and transmission channel attribute information. The transmission channel signal includes at least one virtual speaker signal group and at least one residual signal group.

The bit allocation ratio determining module is configured to determine a bit allocation ratio of the virtual speaker signal group and a bit allocation ratio of the residual signal group based on the transmission channel attribute information.

Figure 8:
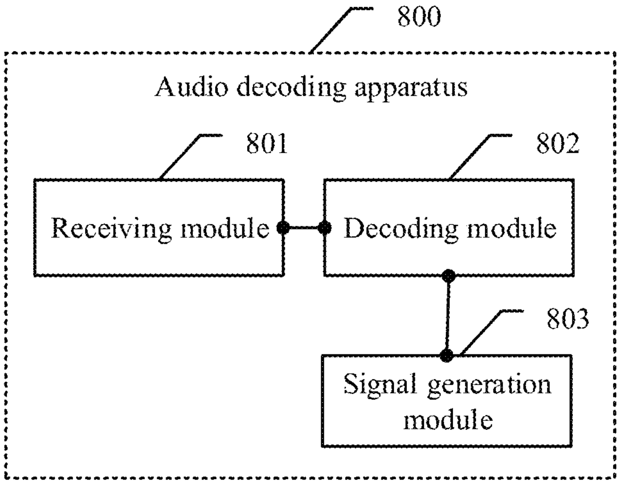
FIG. 8 is a schematic diagram of a composition structure of an audio decoding apparatus according to an embodiment of this application.

FIG. 8 shows a three-dimensional audio signal processing apparatus provided in an embodiment of this application. For example, the three-dimensional audio signal processing apparatus is in one embodiment an audio decoding apparatus 800, and may include a receiving module 801, a decoding module 802, and a signal generation module 803.

The receiving module is configured to receive a bitstream.

The decoding module is configured to decode the bitstream, to obtain a bit allocation ratio of a virtual speaker signal group and a bit allocation ratio of a residual signal group.

The signal generation module is configured to decode a virtual speaker signal and a residual signal in the bitstream based on the bit allocation ratio of the virtual speaker signal group and the bit allocation ratio of the residual signal group, to obtain a three-dimensional audio signal through decoding.

It should be noted that, content such as information exchange and execution processes between modules/units of the foregoing apparatuses is based on a same concept as the method embodiments of this application, and technical effects brought by the information exchange and execution processes are the same as those of the method embodiments of this application. For content, refer to the descriptions in the method embodiments shown in this application. Details are not described herein again.

An embodiment of this application further provides a computer storage medium. The computer storage medium stores a program, and the program performs some or all operations described in the method embodiments.

Figure 9:
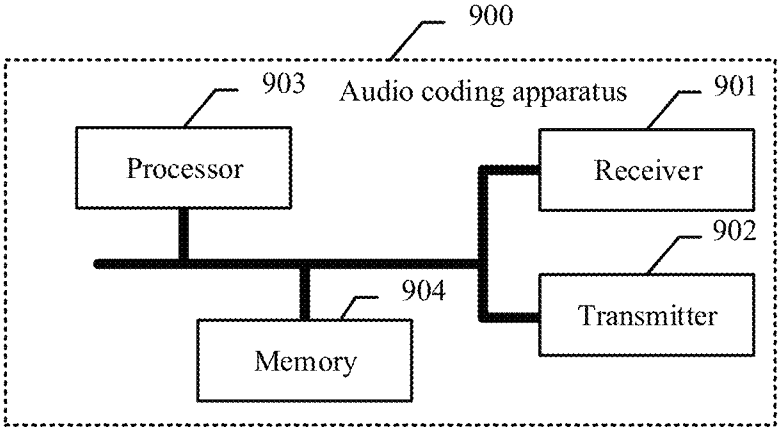
FIG. 9 is a schematic diagram of a composition structure of another audio coding apparatus according to an embodiment of this application.

The following describes another audio coding apparatus provided in an embodiment of this application. As shown in FIG. 9, an audio coding apparatus 900 includes:

- a receiver 901, a transmitter 902, a processor 903, and a memory 904 (there may be one or more processors 903 in the audio coding apparatus 900, and one processor is used as an example in FIG. 9). In some embodiments of this application, the receiver 901, the transmitter 902, the processor 903, and the memory 904 may be connected through a bus or in another manner. In FIG. 9, a bus connection is used as an example.

The memory 904 may include a read-only memory and a random access memory, and provide instructions and data for the processor 903. A part of the memory 904 may further include a nonvolatile random access memory (NVRAM). The memory 904 stores an operating system and operation instructions, an executable module or a data structure, a subset thereof, or an expanded set thereof. The operation instructions may include various operation instructions, to implement various operations. The operating system may include various system programs for implementing various basic services and processing hardware-based tasks.

The processor 903 controls an operation of the audio coding apparatus, and the processor 903 may further be referred to as a central processing unit (CPU). In an application, components of the audio coding apparatus are coupled together through a bus system. In addition to a data bus, the bus system may further include a power bus, a control bus, a status signal bus, and the like. However, for clear description, various types of buses in the figure are referred to as the bus system.

The method disclosed in embodiments of this application may be applied to the processor 903 or may be implemented by the processor 903. The processor 903 may be an integrated circuit chip, and has a signal processing capability. In an implementation process, operations in the foregoing methods may be implemented through an integrated logical circuit of hardware in the processor 903, or by using instructions in a form of software. The processor 903 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, operations, and logical block diagrams that are disclosed in embodiments of this application. The general-purpose processor may be a microprocessor, or the processor may be any conventional processor, or the like. The operations in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 904, and the processor 903 reads information in the memory 904 and completes the operations in the foregoing methods in combination with hardware of the processor 903.

The receiver 901 may be configured to: receive input digit or character information, and generate a signal input related to a related setting and function control of the audio coding apparatus. The transmitter 902 may include a display device, for example, a display, and the transmitter 902 may be configured to output digit or character information through an external interface.

In this embodiment of this application, the processor 903 is configured to perform the method performed by the audio coding apparatus shown in FIG. 4 in the foregoing embodiments.

Figure 10:
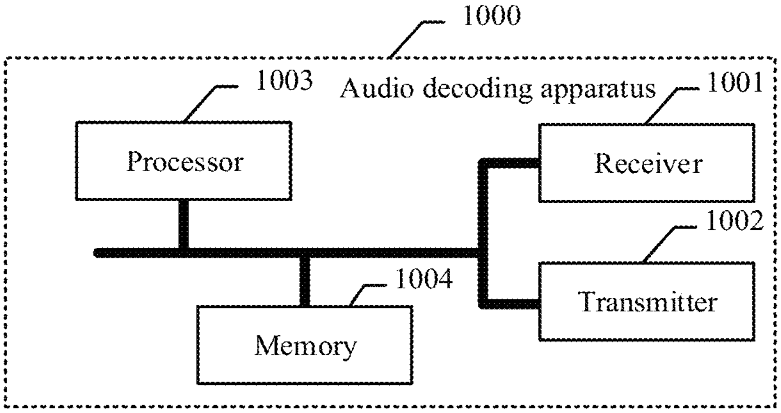
FIG. 10 is a schematic diagram of a composition structure of another audio decoding apparatus according to an embodiment of this application.

The following describes another audio decoding apparatus provided in an embodiment of this application. As shown in FIG. 10, an audio decoding apparatus 1000 includes:

a receiver 1001, a transmitter 1002, a processor 1003, and a memory 1004 (there may be one or more processors 1003 in the audio decoding apparatus 1000, and one processor is used as an example in FIG. 10). In some embodiments of this application, the receiver 1001, the transmitter 1002, the processor 1003, and the memory 1004 may be connected through a bus or in another manner. In FIG. 10, a bus connection is used as an example.

The memory 1004 may include a read-only memory and a random access memory, and provide instructions and data for the processor 1003. A part of the memory 1004 may further include an NVRAM. The memory 1004 stores an operating system and operation instructions, an executable module or a data structure, a subset thereof, or an expanded set thereof. The operation instructions may include various operation instructions, to implement various operations. The operating system may include various system programs for implementing various basic services and processing hardware-based tasks.

The processor 1003 controls an operation of the audio decoding apparatus, and the processor 1003 may further be referred to as a CPU. In an application, components of the audio decoding apparatus are coupled together through a bus system. In addition to a data bus, the bus system may further include a power bus, a control bus, a status signal bus, and the like. However, for clear description, various types of buses in the figure are referred to as the bus system.

The method disclosed in embodiments of this application may be applied to the processor 1003 or may be implemented by the processor 1003. The processor 1003 may be an integrated circuit chip, and has a signal processing capability. In an implementation process, operations in the foregoing methods may be implemented through an integrated logical circuit of hardware in the processor 1003, or by using instructions in a form of software. The processor 1003 may be a general-purpose processor, a DSP, an ASIC, an FPGA or another programmable logic device, a discrete gate or transistor logic device, or a discrete hardware component. The processor may implement or perform the methods, operations, and logical block diagrams that are disclosed in embodiments of this application. The general-purpose processor may be a microprocessor, or the processor may be any conventional processor, or the like. The operations in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1004, and the processor 1003 reads information in the memory 1004 and completes the operations in the foregoing methods in combination with hardware of the processor 1003.

In this embodiment of this application, the processor 1003 is configured to perform the method performed by the audio decoding apparatus shown in FIG. 5 in the foregoing embodiments.

In another embodiment, when the audio coding apparatus or the audio decoding apparatus is a chip in a terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the audio coding method according to any possible implementation of the first embodiment or the audio decoding method according to any possible implementation of the second embodiment. In one embodiment, the storage unit is a storage unit in the chip, for example, a register or a cache; or the storage unit may be a storage unit outside the chip in the terminal, for example, a read-only memory (ROM), another type of static storage device that can store static information and instructions, or a random access memory (RAM).

The processor mentioned above may be a general-purpose central processing unit, a microprocessor, an ASIC, or one or more integrated circuits that are configured to control program execution of the method according to the first embodiment or the second embodiment.

In addition, it should be noted that the apparatus embodiments described above are merely an example. The units described as separate parts may or may not be physically separate, and parts displayed as units may or may not be physical units, may be located in one place, or may be distributed on a plurality of network units. Some or all modules may be selected based on an actual requirement, to achieve objectives of the solutions in embodiments. In addition, in the accompanying drawings of the apparatus embodiments provided in this application, connection relationships between modules indicate that the modules have communication connections with each other, and may be in one embodiment implemented as one or more communication buses or signal cables.

Based on the descriptions of the foregoing implementations, a person skilled in the art may clearly understand that this application may be implemented by software in addition to universal hardware, or by dedicated hardware, including a dedicated integrated circuit, a dedicated CPU, a dedicated memory, a dedicated component, and the like. Usually, any function completed by a computer program may be easily implemented by using corresponding hardware. In addition, hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be embodied in a form of a software product. The computer software product is stored in a readable storage medium, such as a floppy disk, a USB flash drive, a removable hard disk, a ROM, a RAM, a magnetic disk, or an optical disc, and includes several instructions for instructing a computer device (which may be a personal computer, a server, or a network device) to execute the methods described in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from one website site, computer, server or data center to another website site, computer, server or data center in a wired (for example, coaxial cable, optical fiber, digital subscriber line (DSL)) or wireless (for example, infrared, wireless, microwave) manner. The computer-readable storage medium may be any usable medium that can be stored by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A three-dimensional audio signal processing method, comprising:

performing spatial coding on a to-be-coded three-dimensional audio signal to obtain a transmission channel signal and transmission channel attribute information, wherein the transmission channel signal comprises a plurality of virtual speaker signals grouped into at least one virtual speaker signal group and a plurality of residual signals grouped into at least one residual signal group;

determining a bit allocation ratio of the virtual speaker signal group and a bit allocation ratio of the residual signal group based on the transmission channel attribute information; and encoding the transmission channel signal, the bit allocation ratio of the virtual speaker signal group, the bit allocation ratio of the residual signal group, and a bit allocation ratio for each transmission channel of the transmission channel signal-into a bitstream, wherein each transmission channel is used to transmit a virtual speaker signal or a residual signal.

2. The method according to claim 1, wherein the transmission channel attribute information comprises a virtual speaker coding efficiency, the method further comprising:

performing signal reconstruction on the to-be-coded three-dimensional audio signal using a virtual speaker to obtain a reconstructed three-dimensional audio signal;

obtaining an energy representation value of the reconstructed three-dimensional audio signal and an energy representation value of the to-be-coded three-dimensional audio signal; and obtaining the virtual speaker coding efficiency based on the energy representation value of the reconstructed three-dimensional audio signal and the energy representation value of the to-be-coded three-dimensional audio signal.

3. The method according to claim 1, wherein the transmission channel attribute information comprises an energy ratio of the virtual speaker signal group, the method further comprising:

obtaining an energy representation value of the virtual speaker signal group based on an energy representation value of each virtual speaker signal in the virtual speaker signal group;

obtaining an energy representation value of the residual signal group based on an energy representation value of each residual signal in the residual signal group; and obtaining the energy ratio of the virtual speaker signal group based on the energy representation value of the virtual speaker signal group and the energy representation value of the residual signal group.

4. The method according to claim 1, wherein the transmission channel attribute information comprises a virtual speaker code identifier that indicates whether bit allocation of the virtual speaker signal group is dominant, the method further comprising:

performing spatial coding on the to-be-coded three-dimensional audio signal to obtain a quantity of anisotropic sound sources of the transmission channel signal and virtual speaker coding efficiency; and obtaining the virtual speaker code identifier based on the quantity of anisotropic sound sources of the transmission channel signal and the virtual speaker coding efficiency.

5. The method according to claim 4, further comprising: when the quantity of anisotropic sound sources of the transmission channel signal is less than or equal to a preset threshold of the quantity of anisotropic sound sources and the virtual speaker coding efficiency is greater than or equal to a preset first virtual speaker coding efficiency threshold, determining that the virtual speaker code identifier is dominant; or when the quantity of anisotropic sound sources of the transmission channel signal is greater than a preset threshold of the quantity of anisotropic sound sources or the virtual speaker coding efficiency is less than a preset first virtual speaker coding efficiency threshold, determining that the virtual speaker code identifier is not dominant.

6. The method according to claim 5, wherein dominance comprises sub-dominance or pre-dominance, the method further comprising:

when the virtual speaker coding efficiency is greater than or equal to the preset first virtual speaker coding efficiency threshold and the virtual speaker coding efficiency is less than or equal to a preset second virtual speaker coding efficiency threshold, determining that the virtual speaker code identifier is sub-dominant; or when the virtual speaker coding efficiency is greater than or equal to the preset first virtual speaker coding efficiency threshold and the virtual speaker coding efficiency is greater than a preset second virtual speaker coding efficiency threshold, determining that the virtual speaker code identifier is pre-dominant, wherein the preset second virtual speaker coding efficiency threshold is greater than the preset first virtual speaker coding efficiency threshold.

7. The method according to claim 1, wherein the transmission channel attribute information comprises an energy ratio of the virtual speaker signal group and/or a virtual speaker code identifier, the method further comprising:

determining the bit allocation ratio of the virtual speaker signal group and the bit allocation ratio of the residual signal group according to a preset first signal group bit allocation algorithm when the energy ratio of the virtual speaker signal group is greater than or equal to a preset first energy ratio threshold and/or the virtual speaker code identifier is pre-dominant; or determining the bit allocation ratio of the virtual speaker signal group and the bit allocation ratio of the residual signal group according to a preset second signal group bit allocation algorithm when the energy ratio of the virtual speaker signal group is greater than or equal to a preset second energy ratio threshold and less than a preset first energy ratio threshold and/or the virtual speaker code identifier is sub-dominant, wherein the preset second energy ratio threshold is less than the preset first energy ratio threshold; or determining the bit allocation ratio of the virtual speaker signal group and the bit allocation ratio of the residual signal group according to a preset third signal group bit allocation algorithm when the energy ratio of the virtual speaker signal group is less than a preset first energy ratio threshold or the virtual speaker code identifier is not dominant.

8. The method according to claim 7, further comprising: when directionalNrgRatio≥TH1, and/or S≤TH0 and η>TH2 are met, the plurality of virtual speaker signals are grouped into one virtual speaker signal group, and the plurality of residual signals are grouped into one residual signal group, calculating the bit allocation ratio of the virtual speaker signal group in the following manner:

Ratio1_1=FAC1*directionalNrgRatio+(1−FAC1) * maxdirectionalNrgRatio, wherein directionalNrgRatio represents the energy ratio of the virtual speaker signal group, S is a quantity of anisotropic sound sources, n represents a virtual speaker coding efficiency, maxdirectionalNrgRatio is a preset maximum bit allocation ratio of the virtual speaker signal group, FAC1 is a preset first adjustment factor, Ratio1_1 is the bit allocation ratio of the virtual speaker signal group, * represents a multiplication operation, TH1 is the preset first energy ratio threshold, TH0 is a threshold of the quantity of anisotropic sound sources, and TH2 is a second virtual speaker coding efficiency threshold; and calculating the bit allocation ratio of the residual signal group in the following manner:

Ratio2=1−Ratio1_1, wherein

Ratio1_1 is the bit allocation ratio of the virtual speaker signal group, and Ratio2 is the bit allocation ratio of the residual signal group.

9. The method according to claim 8, wherein after the bit allocation ratio of the virtual speaker signal group is obtained, the method further comprises:

updating the bit allocation ratio of the virtual speaker signal group in the following manner:

Ratio1_2=min (Ratio1_1, maxdirectionalNrgRatio+FAC2*Ratio1_1), wherein

Ratio1_2 represents an updated bit allocation ratio of the virtual speaker signal group, FAC2 is a preset second adjustment factor, maxdirectionalNrgRatio is the preset maximum bit allocation ratio of the virtual speaker signal group, Ratio1_1 is the bit allocation ratio that is of the virtual speaker signal group and that exists before updating, * represents a multiplication operation, and min is a minimization operation.

10. The method according to claim 7, further comprising: when TH3≤directionalNrgRatio<TH1 is met, and/or S≤TH0 and TH4≤η≤TH2 are met, the plurality of virtual speaker signals are grouped into one virtual speaker signal group, and the plurality of residual signals are grouped into one residual signal group, calculating Ratio1_1 in the following manner:

Ratio1_1=FAC3*directionalNrgRatio+ (1−FAC3) * maxdirectionalNrgRatio, wherein maxdirectionalNrgRatio is a preset bit allocation ratio of the virtual speaker signal group, FAC3 is a preset third adjustment factor, directionalNrgRatio represents the energy ratio of the virtual speaker signal group, S is a quantity of anisotropic sound sources, n represents a virtual speaker coding efficiency, Ratio1_1 is the bit allocation ratio of the virtual speaker signal group, * represents a multiplication operation, TH0 is a threshold of the quantity of anisotropic sound sources, TH1 is the preset first energy ratio threshold, TH2 is a second virtual speaker coding efficiency threshold, TH3 is the preset second energy ratio threshold, and TH4 is a first virtual speaker coding efficiency threshold; and calculating the bit allocation ratio of the residual signal group in the following manner:

Ratio2=1−Ratio1_1, wherein

Ratio1_1 is the bit allocation ratio of the virtual speaker signal group, and Ratio2 is the bit allocation ratio of the residual signal group.

11. A three-dimensional audio signal processing method, comprising:

receiving a bitstream, wherein the bitstream comprises a bit allocation ratio of a virtual speaker signal group of a transmission channel signal, a bit allocation ratio of a residual signal group of the transmission channel signal, and a bit allocation ratio for each transmission channel of the transmission channel signal, wherein each transmission channel is used to transmit a virtual speaker signal or a residual signal;

decoding the bitstream to obtain the bit allocation ratio for each transmission channel, the bit allocation ratio of a virtual speaker signal group and the bit allocation ratio of a residual signal group; and decoding a virtual speaker signal and a residual signal in the bitstream based on the bit allocation ratio for each transmission channel, the bit allocation ratio of the virtual speaker signal group and the bit allocation ratio of the residual signal group to obtain a three-dimensional audio signal through decoding.

12. The method according to claim 11, further comprising:

determining a quantity of available bits;

determining a bit quantity of the virtual speaker signal group based on the quantity of available bits and the bit allocation ratio of the virtual speaker signal group;

decoding the virtual speaker signal in the bitstream based on the bit quantity of the virtual speaker signal group and a bit allocation ratio of a corresponding transmission channel;

determining a bit quantity of the residual signal group based on the quantity of available bits and the bit allocation ratio of the residual signal group; and decoding the residual signal in the bitstream based on the bit quantity of the residual signal group and a bit allocation ratio of a corresponding transmission channel.

13. A three-dimensional audio signal processing apparatus, comprising:

a memory; and at least one processor coupled to the memory that stores instructions that, when executed by the at least one processor, cause the apparatus to:

perform spatial coding on a to-be-coded three-dimensional audio signal to obtain a transmission channel signal and transmission channel attribute information, wherein the transmission channel signal comprises a plurality of virtual speaker signals grouped into at least one virtual speaker signal group and a plurality of residual signals grouped into at least one residual signal group;

determine a bit allocation ratio of the virtual speaker signal group and a bit allocation ratio of the residual signal group based on the transmission channel attribute information; and encode the transmission channel signal, the bit allocation ratio of the virtual speaker signal group, the bit allocation ratio of the residual signal group, and a bit allocation ratio for each transmission channel of the transmission channel signal into a bitstream, wherein each transmission channel is used to transmit a virtual speaker signal or a residual signal.

14. The three-dimensional audio signal processing apparatus according to claim 13, wherein the three-dimensional audio signal processing apparatus further comprises the memory.

15. The three-dimensional audio signal processing apparatus according to claim 13, wherein the apparatus is further to:

perform signal reconstruction on the to-be-coded three-dimensional audio signal by using a virtual speaker, to obtain a reconstructed three-dimensional audio signal;

obtain an energy representation value of the reconstructed three-dimensional audio signal and an energy representation value of the to-be-coded three-dimensional audio signal; and obtain the virtual speaker coding efficiency based on the energy representation value of the reconstructed three-dimensional audio signal and the energy representation value of the to-be-coded three-dimensional audio signal.

16. A three-dimensional audio signal processing apparatus, comprising:

a memory; and at least one processor coupled to the memory that stores instructions that, when executed by the at least one processor, cause the apparatus to:

receive a bitstream, wherein the bitstream comprises a bit allocation ratio of a virtual speaker signal group of a transmission channel signal, a bit allocation ratio of a residual signal group of the transmission channel signal, and a bit allocation ratio for each transmission channel of the transmission channel signal, wherein each transmission channel is used to transmit a virtual speaker signal or a residual signal;

decode the bitstream, to obtain the bit allocation ratio for each transmission channel, the bit allocation ratio of a virtual speaker signal group and the bit allocation ratio of a residual signal group; and decode a virtual speaker signal and a residual signal in the bitstream based on the bit allocation ratio for each transmission channel, the bit allocation ratio of the virtual speaker signal group and the bit allocation ratio of the residual signal group, to obtain a three-dimensional audio signal through decoding.

17. The three-dimensional audio signal processing apparatus according to claim 16, wherein the three-dimensional audio signal processing apparatus further comprises the memory.

18. The three-dimensional audio signal processing apparatus according to claim 16, wherein the apparatus is further to:

determine a quantity of available bits;

determine a bit quantity of the virtual speaker signal group based on the quantity of available bits and the bit allocation ratio of the virtual speaker signal group, and decoding the virtual speaker signal in the bitstream based on the bit quantity of the virtual speaker signal group and a bit allocation ratio of a corresponding transmission channel; and determine a bit quantity of the residual signal group based on the quantity of available bits and the bit allocation ratio of the residual signal group, and decoding the residual signal in the bitstream based on the bit quantity of the residual signal group and a bit allocation ratio of a corresponding transmission channel.

19. A non-transitory computer-readable storage medium, comprising instructions, wherein when the instructions run on a computer, the computer is enabled to perform the method according to claim 16.

20. A non-transitory computer-readable storage medium, comprising a bitstream generated in the method according to claim 1.

* * * * *